(12) United States Patent
Zhu et al.

(10) Patent No.: US 12,038,075 B2
(45) Date of Patent: Jul. 16, 2024

(54) GEAR-HYDRAULIC-RHOMBIC PYRAMID INTEGRATED MULTI-MODE HYBRID TRANSMISSION DEVICE

(71) Applicant: JIANGSU UNIVERSITY, Zhenjiang (CN)

(72) Inventors: Zhen Zhu, Zhenjiang (CN); Lingxin Zeng, Zhenjiang (CN); Yingfeng Cai, Zhenjiang (CN); Long Chen, Zhenjiang (CN); Yulin Deng, Zhenjiang (CN); Xiaodong Sun, Zhenjiang (CN); Xiang Tian, Zhenjiang (CN); Yong Wang, Zhenjiang (CN); Falin Zeng, Zhenjiang (CN); Chaofeng Pan, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/784,675

(22) PCT Filed: Jun. 25, 2021

(86) PCT No.: PCT/CN2021/102306
§ 371 (c)(1),
(2) Date: Dec. 29, 2022

(87) PCT Pub. No.: WO2022/266988
PCT Pub. Date: Dec. 29, 2022

(65) Prior Publication Data
US 2024/0200643 A1    Jun. 20, 2024

(30) Foreign Application Priority Data
Jun. 23, 2021    (CN) .......................... 202110698769.5

(51) Int. Cl.
*F16H 47/08*    (2006.01)
*F16H 63/30*    (2006.01)

(52) U.S. Cl.
CPC ......... *F16H 47/08* (2013.01); *F16H 63/3023* (2013.01)

(58) Field of Classification Search
CPC .............................. F16H 63/3023; F16H 47/08
(Continued)

(56) References Cited

U.S. PATENT DOCUMENTS 2,020,677 A * 11/1935 Erban ..................... F16H 55/34
476/72
5,263,907 A * 11/1993 Fellows .................. F16H 15/38
476/72
(Continued)

FOREIGN PATENT DOCUMENTS

CN    101598205 A    12/2009
CN    109723788 A    5/2019
(Continued)

*Primary Examiner* — Colby M Hansen
(74) *Attorney, Agent, or Firm* — Bayramoglu Law Offices LLC

(57) ABSTRACT

A gear-hydraulic-rhombic pyramid integrated multi-mode hybrid transmission device includes an input assembly, a hydraulic transmission mechanism, a front planetary gear mechanism, a rhombic pyramid-type continuously variable transmission mechanism, a rear planetary gear mechanism, an output assembly, a clutch assembly, and a brake assembly. The clutch assembly connects an output end of the input assembly to an input end of the hydraulic transmission mechanism and an input end of the front planetary gear mechanism. The clutch assembly connects an output end of the hydraulic transmission mechanism to the front planetary gear mechanism and the rear planetary gear mechanism. The clutch assembly connects the front planetary gear mechanism, the rhombic pyramid-type continuously variable transmission mechanism, the rear planetary gear mechanism, and the output assembly in sequence. The clutch assembly and
(Continued)

the brake assembly provide a continuous transmission ratio between the input assembly and the output assembly.

8 Claims, 13 Drawing Sheets

(58) Field of Classification Search
USPC .......................................................... 475/207
See application file for complete search history.

(56) References Cited

U.S. PATENT DOCUMENTS

| | | | | |
|---|---|---|---|---|
| 6,464,616 | B1* | 10/2002 | Kamamura | F16H 15/38 |
| | | | | 476/72 |
| 11,480,238 | B1* | 10/2022 | Profumo | F16H 37/084 |
| 2002/0111248 | A1* | 8/2002 | Schmid | F16H 61/66272 |
| | | | | 477/44 |
| 2013/0133972 | A1* | 5/2013 | Elliott | F16H 61/46 |
| | | | | 60/459 |
| 2019/0195290 | A1* | 6/2019 | Suzuki | F16H 37/0846 |

FOREIGN PATENT DOCUMENTS

| | | | |
|---|---|---|---|
| CN | 111120614 | A | 5/2020 |
| CN | 111306279 | A | 6/2020 |
| CN | 111946793 | A | 11/2020 |
| DE | 19631236 | A1 | 2/1997 |
| DE | 102017219093 | A1 | 4/2019 |

* cited by examiner

US 12,038,075 B2

GEAR-HYDRAULIC-RHOMBIC PYRAMID INTEGRATED MULTI-MODE HYBRID TRANSMISSION DEVICE

CROSS REFERENCE TO THE RELATED APPLICATIONS

This application is the national phase entry of International Application No. PCT/CN2021/102306, filed on Jun. 25, 2021, which is based upon and claims priority to Chinese Patent Application No. 202110698769.5, filed on Jun. 23, 2021, the entire contents of which are incorporated herein by reference.

TECHNICAL FIELD

The present invention relates to the field of variable transmission devices, and in particular, to a gear-hydraulic-rhombic pyramid integrated multi-mode hybrid transmission device.

BACKGROUND

In recent years, with the development of cities and the acceleration of major project construction, engineering machinery is more widely used and has greater space for development. The complex and varying working environment of engineering machinery leads to great changes in engine load and frequent changes in mechanical running speed during the operation. Therefore, it is very important for engineering machinery to change the speed and torque in a timely manner by using a variable transmission device to adapt to continuous changes in the actual load, thereby ensuring the power performance and fuel economy of vehicles.

Variable transmission modes currently used in engineering machinery generally include gear single-flow transmission, hydraulic single-flow transmission, and hydraulic-gear hybrid transmission. The gear single-flow transmission has high efficiency, but the transmission ratio is fixed and frequent shifts are required during operation. The hydraulic single-flow transmission can easily realize stepless speed regulation and enables high torque transmission, but the transmission efficiency is low. The hydraulic-gear hybrid transmission is a transmission mode that combines hydraulic power flow and mechanical power flow in parallel, and achieves both high efficiency in gear transmission and high torque in hydraulic transmission; however, it has high requirements for a variable displacement hydraulic pump, a fixed displacement hydraulic motor, and a hydraulic system. The rhombic pyramid-type continuously variable transmission features high transmission power, strong load capacity, and low output speed and is mostly used in engineering machinery; however, it provides a transmission ratio that changes within a limited range.

The prior art only relates to the designs of single-flow transmission devices and hybrid transmission devices that combine two types of single-flow transmissions in parallel, and fails to fully satisfy the design requirements of engineering machinery for transmission devices with multiple modes, especially multiple hybrid modes, in different working conditions.

SUMMARY

To eliminate the defects in the prior art, the present invention provides a gear-hydraulic-rhombic pyramid integrated multi-mode hybrid transmission device, which implements switching between multiple modes including hydraulic transmission, gear transmission, rhombic pyramid-type continuously variable transmission, hydraulic-gear hybrid transmission, gear-rhombic pyramid hybrid transmission, hydraulic-rhombic pyramid series hybrid transmission, hydraulic-rhombic pyramid parallel hybrid transmission, and gear-hydraulic-rhombic pyramid hybrid transmission through engagement/disengagement of a clutch assembly and a brake assembly.

The present invention achieves the above objective through the following technical solution.

A gear-hydraulic-rhombic pyramid integrated multi-mode hybrid transmission device includes an input assembly, a hydraulic transmission mechanism, a front planetary gear mechanism, a rhombic pyramid-type continuously variable transmission mechanism, a rear planetary gear mechanism, an output assembly, a clutch assembly, and a brake assembly, wherein the clutch assembly connects an output end of the input assembly to an input end of the hydraulic transmission mechanism and an input end of the front planetary gear mechanism; the clutch assembly connects an output end of the hydraulic transmission mechanism to the front planetary gear mechanism and the rear planetary gear mechanism; the clutch assembly connects the front planetary gear mechanism to the rhombic pyramid-type continuously variable transmission mechanism, connects the rhombic pyramid-type continuously variable transmission mechanism to the rear planetary gear mechanism, and connects the rear planetary gear mechanism to the output assembly; the clutch assembly and the brake assembly provide a continuous transmission ratio between the input assembly and the output assembly.

Further, any one of or a combination of any two or three of transmission modes including hydraulic transmission H, gear transmission G, and rhombic pyramid-type continuously variable transmission S is provided between the input assembly and the output assembly by adjusting a displacement ratio of the hydraulic transmission mechanism, adjusting a transmission ratio of the rhombic pyramid-type continuously variable transmission mechanism, and selectively controlling engagement of the clutch assembly and the brake assembly.

Further, the clutch assembly includes a first clutch $C_1$, a second clutch $C_2$, a third clutch $C_3$, a fifth clutch $C_5$, a seventh clutch $C_7$, an eighth clutch $C_8$, a one-way clutch F, and a tenth clutch $C_{10}$, wherein the first clutch $C_1$ is used for selectively connecting the input assembly to the input end of the hydraulic transmission mechanism; the second clutch $C_2$ is used for selectively connecting the output end of the hydraulic transmission mechanism to a ring gear of the front planetary gear mechanism to achieve synchronous rotation; the third clutch $C_3$ is used for selectively connecting the output end of the hydraulic transmission mechanism to a planet carrier of the rear planetary gear mechanism to achieve synchronous rotation; the fifth clutch $C_5$ is used for selectively connecting a sun gear of the front planetary gear mechanism to a planet carrier of the front planetary gear mechanism to achieve synchronous rotation; the seventh clutch $C_7$ is used for selectively connecting the planet carrier of the front planetary gear mechanism to a third gear pair to achieve synchronous rotation; the eighth clutch $C_8$ is used for selectively connecting a fourth gear pair to the planet carrier of the rear planetary gear mechanism to achieve synchronous rotation; the third gear pair is connected to the fourth gear pair via a central shaft; the one-way clutch F is used for controlling forward power transmission after the fourth gear pair is connected to the planet carrier of the rear planetary gear mechanism; the tenth clutch $C_{10}$ is used for selectively connecting the planet carrier of the rear planetary gear mechanism to a ring gear of the rear planetary gear mechanism to achieve synchronous rotation; different types of hydraulic transmission H are provided between the input assembly and the output assembly by adjusting the displacement ratio of the hydraulic transmission mechanism and selectively controlling engagement of the first clutch $C_1$, the third clutch $C_3$, and the tenth clutch $C_{10}$, or by adjusting the displacement ratio of the hydraulic transmission mechanism and selectively controlling engagement of the first clutch $C_1$, the second clutch $C_2$, the fifth clutch $C_5$, the seventh clutch $C_7$, the eighth clutch $C_8$, the one-way clutch F, and the tenth clutch $C_{10}$.

Further, the clutch assembly further includes a fourth clutch $C_4$, wherein the fourth clutch $C_4$ is used for selectively connecting the input assembly to the sun gear of the front planetary gear mechanism to achieve synchronous rotation; the brake assembly includes a brake B, wherein the brake B is used for selectively connecting the ring gear of the front planetary gear mechanism to a fixed member; gear transmission G is provided between the input assembly and the output assembly by controlling engagement of the fourth clutch $C_4$, the seventh clutch $C_7$, the eighth clutch $C_8$, the one-way clutch F, the tenth clutch $C_{10}$, and the brake B.

Further, the clutch assembly further includes a sixth clutch $C_6$ and a ninth clutch $C_9$, wherein the sixth clutch $C_6$ is used for selectively connecting the planet carrier of the front planetary gear mechanism to an input end of the rhombic pyramid-type continuously variable transmission mechanism to achieve synchronous rotation; the ninth clutch $C_9$ is used for selectively connecting an output end of the rhombic pyramid-type continuously variable transmission mechanism to a sun gear of the rear planetary gear mechanism to achieve synchronous rotation; rhombic pyramid-type continuously variable transmission S is provided between the input assembly and the output assembly by adjusting the transmission ratio of the rhombic pyramid-type continuously variable transmission mechanism and selectively controlling engagement of the fourth clutch $C_4$, the fifth clutch $C_8$, the sixth clutch $C_6$, the ninth clutch $C_9$, and the tenth clutch $C_{10}$.

Further, hydraulic-gear hybrid transmission HG is provided between the input assembly and the output assembly by adjusting the displacement ratio of the hydraulic transmission mechanism and selectively controlling engagement of the first clutch $C_1$, the second clutch $C_2$, the fourth clutch $C_4$, the seventh clutch $C_7$, the eighth clutch $C_8$, the one-way clutch F, and the tenth clutch $C_{10}$;

gear-rhombic pyramid hybrid transmission GS is provided between the input assembly and the output assembly by adjusting the transmission ratio of the rhombic pyramid-type continuously variable transmission mechanism and selectively controlling engagement of the fourth clutch $C_4$, the fifth clutch $C_8$, the sixth clutch $C_6$, the seventh clutch $C_7$, the eighth clutch $C_8$, the one-way clutch F, and the ninth clutch $C_9$;

different types of hydraulic-rhombic pyramid series-parallel hybrid transmission HS are provided between the input assembly and the output assembly by adjusting the displacement ratio of the hydraulic transmission mechanism, adjusting the transmission ratio of the rhombic pyramid-type continuously variable transmission mechanism, selectively controlling engagement of the first clutch $C_1$, the fifth clutch $C_5$, the sixth clutch $C_6$, and the ninth clutch $C_9$, and selectively controlling engagement of the second clutch $C_2$ and the tenth clutch $C_{10}$ or engagement of the third clutch $C_3$ and the fourth clutch $C_4$.

Further, hydraulic-rhombic pyramid-gear hybrid transmission HSG is provided between the input assembly and the output assembly by adjusting the displacement ratio of the hydraulic transmission mechanism, adjusting the transmission ratio of the rhombic pyramid-type continuously variable transmission mechanism, and selectively controlling engagement of the first clutch $C_1$, the second clutch $C_2$, the fourth clutch $C_4$, the sixth clutch $C_6$, the ninth clutch $C_9$, and the tenth clutch $C_{10}$.

Further, stepless speed regulation of switching between the transmission modes "hydraulic transmission H→gear transmission G→hydraulic-gear hybrid transmission HG→hydraulic-rhombic pyramid-gear hybrid transmission HSG" is provided by adjusting the displacement ratio of the hydraulic transmission mechanism, adjusting the transmission ratio of the rhombic pyramid-type continuously variable transmission mechanism, and selectively controlling engagement of the clutch assembly and the brake assembly.

Further, stepless speed regulation of switching between the transmission modes "gear-rhombic pyramid hybrid transmission GS→rhombic pyramid-type continuously variable transmission S" is provided by adjusting the transmission ratio of the rhombic pyramid-type continuously variable transmission mechanism and selectively controlling engagement of the clutch assembly and the brake assembly.

Further, stepless speed regulation of switching between the transmission modes "hydraulic transmission H→rhombic pyramid-type continuously variable transmission S→hydraulic-rhombic pyramid hybrid transmission HS" is provided by adjusting the displacement ratio of the hydraulic transmission mechanism, adjusting the transmission ratio of the rhombic pyramid-type continuously variable transmission mechanism, and controlling engagement of the clutch assembly.

The present invention has the following beneficial effects:

1. The gear-hydraulic-rhombic pyramid integrated multi-mode hybrid transmission device of the present invention implements switching between multiple modes including gear transmission, hydraulic transmission, rhombic pyramid-type continuously variable transmission, hydraulic-gear hybrid transmission, gear-rhombic pyramid hybrid transmission, hydraulic-rhombic pyramid series hybrid transmission, hydraulic-rhombic pyramid parallel hybrid transmission, and gear-hydraulic-rhombic pyramid hybrid transmission through engagement/disengagement of the clutch assembly and the brake assembly, so as to meet the requirements of engineering machinery in multiple working conditions, improve engine power utilization, and increase fuel economy.

2. The gear-hydraulic-rhombic pyramid integrated multi-mode hybrid transmission device of the present invention effectively reduces the shift impact and expands the speed ratio adjustment range. The hydraulic transmission enables quick startup and stable operation and implements speed variation and direction change easily and rapidly without causing impact. The rhombic pyramid-type continuously variable transmission has a continuously changing transmission ratio and causes extremely small impact on the mechanism during operation. Besides, the one-way clutch is disposed between the rhombic pyramid-type continuously variable transmission mechanism and the rear planetary gear mechanism to eliminate downshift impact during shifting.

3. The gear-hydraulic-rhombic pyramid integrated multi-mode hybrid transmission device of the present invention provides the hydraulic-rhombic pyramid series transmission mode and the hydraulic-rhombic pyramid parallel transmission mode. The hydraulic-rhombic pyramid series transmission mode effectively expands the speed regulation range and meets the requirement of non-linear stepless speed regulation within a large range. The hydraulic-rhombic pyramid parallel transmission mode improves the system transmission efficiency and meets the requirement of regional high-efficiency stepless speed regulation.

Figure 1:
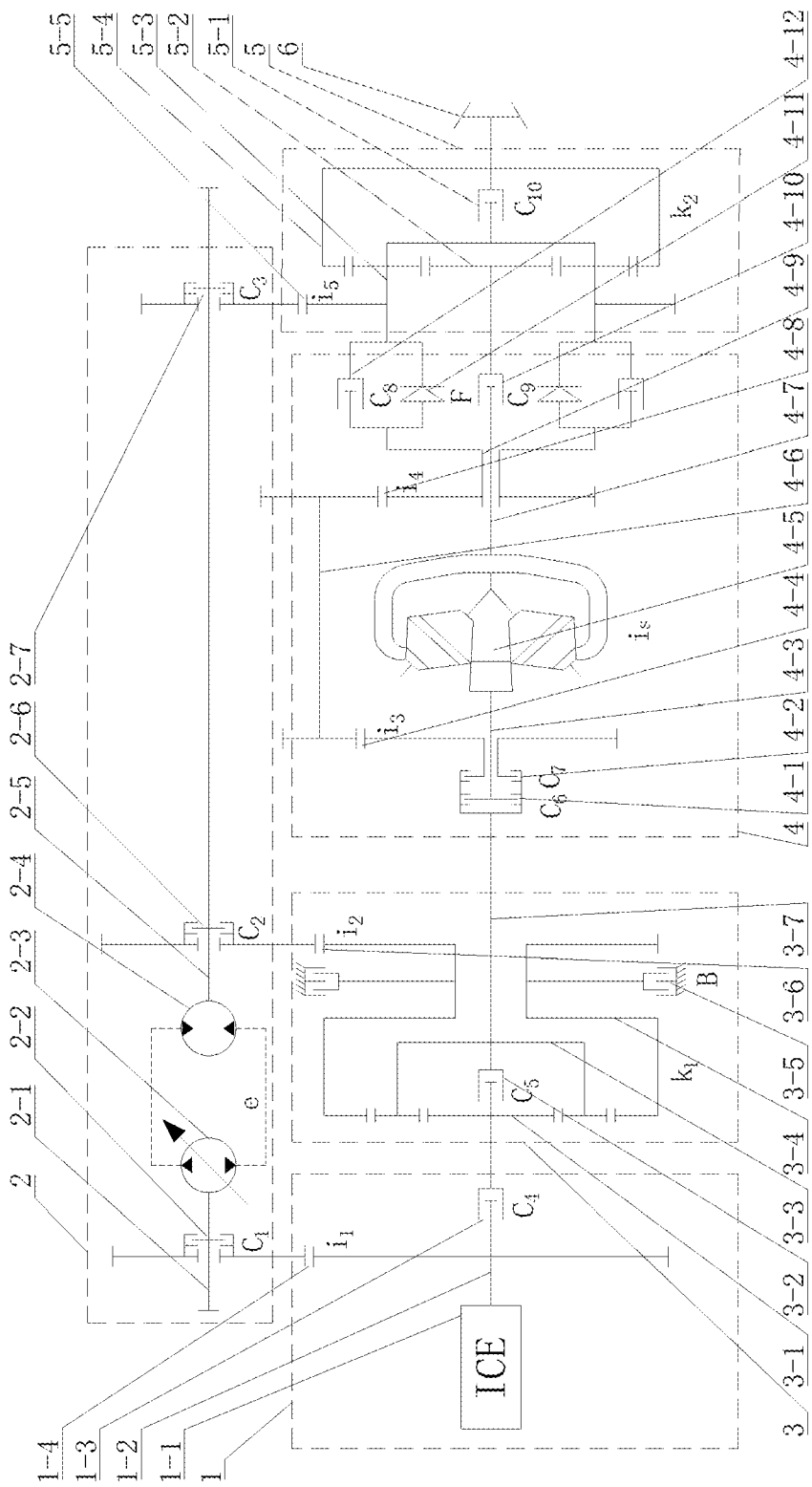
FIG. 1 is a schematic structural diagram of a gear-hydraulic-rhombic pyramid integrated multi-mode hybrid transmission device according to the present invention.

In the drawings:
1. input assembly; 1-1. engine; 1-2. input shaft; 1-3. fourth clutch $C_4$; 1-4. first gear pair; 2. hydraulic transmission mechanism; 2-1. hydraulic transmission input shaft; 2-2. first clutch $C_1$; 2-3. variable displacement hydraulic pump; 2-4. fixed displacement hydraulic motor; 2-5. hydraulic transmission output shaft; 2-6. second clutch $C_2$; 2-7. third clutch $C_3$; 3. front planetary gear mechanism; 3-1. front planetary gear-sun gear; 3-2. fifth clutch $C_5$; 3-3. front planetary gear-planet carrier; 3-4. front planetary gear-ring gear; 3-5. brake B; 3-6. second gear pair; 3-7. power output shaft of the front planetary gear mechanism; 4. rhombic pyramid-type continuously variable transmission mechanism; 4-1. sixth clutch $C_6$; 4-2. seventh clutch $C_7$; 4-3. power input shaft of the rhombic pyramid-type continuously variable transmission mechanism; 4-4. third gear pair; 4-5. rhombic pyramid-type continuously variable transmission; 4-6. central shaft; 4-7. power output shaft of the rhombic pyramid-type continuously variable transmission mechanism; 4-8. fourth gear pair; 4-9. output gear shaft of a constant speed ratio transmission device; 4-10. ninth clutch $C_9$; 4-11. one-way clutch F; 4-12. eighth clutch $C_8$; 5. rear planetary gear mechanism; 5-1. tenth clutch $C_{10}$; 5-2. rear planetary gear-sun gear; 5-3. rear planetary gear-planet carrier; 5-4. rear planetary gear-ring gear; 5-5. fifth gear pair; 6. output assembly.

DETAILED DESCRIPTION OF THE EMBODIMENTS

The present invention is further described below with reference to the accompanying drawings and specific embodiments, but the protection scope of the present invention is not limited thereto.

Embodiments of the present invention are described in detail below and are exemplified in the accompanying drawings, wherein the same or similar reference signs indicate the same or similar elements or elements with the same or similar functions. The embodiments described below with reference to the accompanying drawings are exemplary and are intended to explain the present invention, instead of limiting the present invention.

In the description of the present invention, it should be understood that terms such as "central", "longitudinal", "transverse", "length", "width", "thickness", "upper", "lower", "axial", "radial", "vertical", "horizontal", "inner", and "outer" indicate directional or positional relationships based on the accompanying drawings. They are merely used for the convenience and simplicity of the description of the present invention, instead of indicating or implying that the demonstrated device or element is located in a specific direction or is constructed and operated in a specific direction. Therefore, they cannot be construed as limitations to the present invention. Moreover, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the present invention, "a plurality of" means two or above two, unless otherwise expressly defined.

In the present invention, unless otherwise expressly specified and defined, terms such as "mounted", "interconnected", "connected", and "fixed" should be understood in a broad sense. For example, they may be fixed connections, detachable connections, or integral connections; may be mechanical connections or electrical connections; may be direct connections or indirect connections through an intermediate medium; and may be internal communications between two elements. The specific meanings of the above terms in the present invention can be understood by persons of ordinary skill in the art according to specific situations.

As shown in FIG. 1, the gear-hydraulic-rhombic pyramid integrated multi-mode hybrid transmission device of the present invention includes an input assembly 1, a hydraulic transmission mechanism 2, a front planetary gear mechanism 3, a rhombic pyramid-type continuously variable transmission mechanism 4, a rear planetary gear mechanism 5, an output assembly 6, a clutch assembly, and a brake assembly. The clutch assembly connects an output end of the input assembly 1 to an input end of the hydraulic transmission mechanism 2 and an input end of the front planetary gear mechanism 3. The clutch assembly connects an output end of the hydraulic transmission mechanism 2 to the front planetary gear mechanism 3 and the rear planetary gear mechanism 5. The clutch assembly connects the front planetary gear mechanism 3 to the rhombic pyramid-type continuously variable transmission mechanism 4, connects the rhombic pyramid-type continuously variable transmission mechanism 4 to the rear planetary gear mechanism 5, and connects the rear planetary gear mechanism 5 to the output assembly 6. The clutch assembly and the brake assembly provide a continuous transmission ratio between the input assembly 1 and the output assembly 6.

The input assembly 1 includes an engine 1-1, an input shaft 1-2, a fourth clutch $C_4$ 1-3, and a first gear pair 1-4. The input shaft 1-2 of the engine 1-1 is connected to the input end of the hydraulic transmission mechanism 2 via the first gear pair 1-4. The fourth clutch $C_4$ 1-3 is used for selectively connecting the input shaft 1-2 to a sun gear of the front planetary gear mechanism 3 to achieve synchronous rotation. The engine power is transmitted through the input shaft 1-2 to the front planetary gear mechanism 3 after the fourth clutch $C_4$ 1-3 is engaged.

The hydraulic transmission mechanism 2 includes a hydraulic transmission input shaft 2-1, a first clutch $C_1$ 2-2, a variable displacement hydraulic pump 2-3, a fixed displacement hydraulic motor 2-4, a hydraulic transmission output shaft 2-5, a second clutch $C_2$ 2-6, and a third clutch $C_3$ 2-7. The hydraulic transmission input shaft 2-1 is connected to the variable displacement hydraulic pump 2-3, the fixed displacement hydraulic motor 2-4 is connected to the hydraulic transmission output shaft 2-5, the variable displacement hydraulic pump 2-3 is used for driving the fixed displacement hydraulic motor 2-4, and the first clutch $C_1$ 2-2 is used for selectively connecting the input shaft 1-2 to the hydraulic transmission input shaft 2-1. The second clutch $C_2$ 2-6 is used for selectively connecting the hydraulic transmission output shaft 2-5 to a front planetary gear-ring gear 3-4 via a second gear pair 3-6 to achieve synchronous rotation. The third clutch $C_3$ 2-7 is used for selectively connecting the hydraulic transmission output shaft 2-5 to a rear planetary gear-planet carrier 5-3 via a fifth gear pair 5-5 to achieve synchronous rotation.

The front planetary gear mechanism 3 includes a front planetary gear-sun gear 3-1, a fifth clutch $C_5$ 3-2, a front planetary gear-planet carrier 3-3, the front planetary gear-ring gear 3-4, a brake B 3-5, the second gear pair 3-6, and a power output shaft 3-7 of the front planetary gear mechanism. The front planetary gear-sun gear 3-1, the front planetary gear-planet carrier 3-3, and the front planetary gear-ring gear 3-4 form a planetary gear train. The brake B 3-5 is used for selectively fixing the front planetary gear-ring gear 3-4. The fifth clutch $C_5$ 3-2 is used for selectively connecting the front planetary gear-sun gear 3-1 to the front planetary gear-planet carrier 3-3 to achieve synchronous rotation, that is, the front planetary gear mechanism 3 is fixedly connected as a whole. The power output shaft 3-7 of the front planetary gear mechanism is connected to the front planetary gear-planet carrier 3-3.

The rhombic pyramid-type continuously variable transmission mechanism 4 includes a sixth clutch $C_6$ 4-1, a seventh clutch $C_7$ 4-2, a power input shaft 4-3 of the rhombic pyramid-type continuously variable transmission mechanism, a third gear pair 4-4, a rhombic pyramid-type continuously variable transmission 4-5, a central shaft 4-6, a power output shaft 4-7 of the rhombic pyramid-type continuously variable transmission mechanism, a fourth gear pair 4-8, an output gear shaft 4-9 of a constant speed ratio transmission device, a ninth clutch $C_9$ 4-10, a one-way clutch F 4-11, and an eighth clutch $C_8$ 4-12.

The third gear pair 4-4 is connected to the fourth gear pair 4-8 via the central shaft 4-6, thereby forming the constant speed ratio transmission device in the rhombic pyramid-type continuously variable transmission mechanism. An output gear of the fourth gear pair 4-8 is freely sleeved on the power output shaft 4-7 of the rhombic pyramid-type continuously variable transmission mechanism via the output gear shaft 4-9 of the constant speed ratio transmission device. To avoid the occurrence of a reverse power flow in gear shift of the rhombic pyramid-type continuously variable transmission mechanism, the one-way clutch F 4-11 is disposed between the output gear shaft 4-9 of the constant speed ratio transmission device and the rear planetary gear-planet carrier 5-3. Meanwhile, to ensure the anti-drag condition of the engine, the eighth clutch $C_8$ 4-12 is arranged in parallel between the output gear shaft 4-9 of the constant speed ratio transmission device and the rear planetary gear-planet carrier 5-3 in addition to the one-way clutch F 4-11. The specific arrangement is as follows: An inner ring of the one-way clutch F 4-11 and a driving disc of the eighth clutch $C_8$ 4-12 are fixed on the output gear shaft 4-9 of the constant speed ratio transmission device via splines, a driven disc of the eighth clutch $C_8$ 4-12 is connected to an outer ring of the one-way clutch F 4-11 via a connecting shaft sleeve, and meanwhile, the driven disc of the eighth clutch $C_8$ 4-12 is fixedly connected on the rear planetary gear-planet carrier 5-3, so that power is transmitted from the constant speed ratio transmission mechanism to the rear planetary gear-planet carrier 5-3. The sixth clutch $C_6$ 4-1 is used for selectively connecting the power output shaft 3-7 of the front planetary gear mechanism to the power input shaft 4-3 of the rhombic pyramid-type continuously variable transmission mechanism to achieve synchronous rotation. The seventh clutch $C_7$ 4-2 is used for selectively connecting the power output shaft 3-7 of the front planetary gear mechanism to the third gear pair 4-4 to achieve synchronous rotation. The ninth clutch $C_9$ 4-10 is used for selectively connecting the power output shaft 4-7 of the rhombic pyramid-type continuously variable transmission mechanism to a sun gear 5-2 of the rear planetary gear mechanism to achieve synchronous rotation. The power input shaft 4-3 of the rhombic pyramid-type continuously variable transmission mechanism is connected to the power output shaft 4-7 of the rhombic pyramid-type continuously variable transmission mechanism via the rhombic pyramid-type continuously variable transmission 4-5. The power output shaft 4-7 of the rhombic pyramid-type continuously variable transmission mechanism is connected to the rear planetary gear-sun gear 5-2 via the ninth clutch $C_9$ 4-10 to achieve synchronous rotation.

The rear planetary gear mechanism 5 includes a tenth clutch $C_{10}$ 5-1, the rear planetary gear-sun gear 5-2, the rear planetary gear-planet carrier 5-3, a rear planetary gear-ring gear 5-4, and the fifth gear pair 5-5. The rear planetary gear-sun gear 5-2, the rear planetary gear-planet carrier 5-3, and the rear planetary gear-ring gear 5-4 form a planetary gear train. The tenth clutch $C_{10}$ 5-1 is used for selectively connecting the rear planetary gear-planet carrier 5-3 to the rear planetary gear-ring gear 5-4 to achieve synchronous rotation, that is, the rear planetary gear mechanism is fixedly connected as a whole. The output assembly 6 is connected to the rear planetary gear-ring gear 5-4.

variable transmission mechanism 4, and selectively controlling engagement of the clutch assembly and the brake assembly. The engaged components in each transmission mode are shown in Table 1. The details are as follows:

TABLE 1

| | | Engagement state of mode-switching components | | | | | | | | | | | | |
|---|---|---|---|---|---|---|---|---|---|---|---|---|---|---|
| | | State of execution components | | | | | | | | | | | | Input-output speed |
| Type | Mode | $C_1$ | $C_2$ | $C_3$ | $C_4$ | $C_5$ | $C_6$ | $C_7$ | $C_8$ | $C_9$ | $C_{10}$ | B | F | relationship |
| Single-flow transmission | Hydraulic transmission H1 | ▲ | △ | ▲ | △ | △ | △ | △ | △ | △ | ▲ | △ | △ | $n_o(H1) = \dfrac{e}{i_1 i_5} n_I$ |
| | Hydraulic transmission H2 | ▲ | ▲ | △ | △ | ▲ | △ | ▲ | ▲ | △ | △ | △ | ▲ | $n_o(H2) = \dfrac{e}{i_1 i_2 i_3 i_4} n_I$ |
| | Gear transmission G | △ | △ | △ | ▲ | △ | △ | ▲ | ▲ | △ | △ | ▲ | ▲ | $n_o(G) = \dfrac{1}{(1+k_1) i_3 i_4} n_I$ |
| | Rhombic pyramid-type continuously variable transmission S | △ | △ | △ | ▲ | ▲ | ▲ | △ | △ | ▲ | ▲ | △ | △ | $n_o(S) = \dfrac{1}{i_s} n_I$ |
| Hybrid transmission | Hydraulic-gear hybrid transmission HG | ▲ | ▲ | △ | ▲ | △ | △ | ▲ | ▲ | △ | ▲ | △ | ▲ | $n_o(HG) = \dfrac{1 + \dfrac{k_1 e}{i_1 i_2}}{(1+k_1) i_3 i_4} n_I$ |
| | Gear-rhombic pyramid hybrid transmission GS | △ | △ | △ | ▲ | ▲ | ▲ | ▲ | ▲ | ▲ | △ | △ | ▲ | $n_o(GS) = \dfrac{\dfrac{(1+k_2)}{i_3 i_4} - \dfrac{1}{i_s}}{k_2} n_I$ |
| | Hydraulic-rhombic pyramid series hybrid transmission HS1 | ▲ | ▲ | △ | △ | ▲ | ▲ | △ | △ | ▲ | ▲ | △ | ▲ | $n_0(HS1) = \dfrac{e}{i_1 i_2 i_s} n_I$ |
| | Hydraulic rhombic pyramid parallel hybrid transmission HS2 | ▲ | △ | ▲ | ▲ | ▲ | ▲ | △ | △ | ▲ | △ | △ | △ | $n_o(HS2) = \dfrac{\dfrac{(1+k_2)e}{i_1 i_5} - \dfrac{1}{i_s}}{k_2} n_I$ |
| | Hydraulic-rhombic pyramid-gear hybrid transmission HSG | ▲ | ▲ | △ | ▲ | △ | ▲ | △ | △ | ▲ | ▲ | △ | △ | $n_o(HSG) = \dfrac{1 + \dfrac{k_1 e}{i_1 i_2}}{(1+k_1) i_s} n_I$ |

Switching between multiple modes including gear transmission, hydraulic transmission, rhombic pyramid-type continuously variable transmission, hydraulic-gear hybrid transmission, gear-rhombic pyramid hybrid transmission, hydraulic-rhombic pyramid series hybrid transmission, hydraulic-rhombic pyramid parallel hybrid transmission, and hydraulic-rhombic pyramid-gear hybrid transmission is provided between the input assembly 1 and the output assembly 6 by adjusting the displacement ratio of the hydraulic transmission mechanism 2, adjusting the transmission ratio of the rhombic pyramid-type continuously In Table 1: ▲ stands for engagement of an execution component and △ stands for disengagement of an execution component; $n_o(H1)$ is output speed in the hydraulic transmission mode H1, $n_o(H2)$ is output speed in the hydraulic transmission mode H2, $n_o(G)$ is output speed in the gear transmission mode G, $n_o(S)$ is output speed in the rhombic pyramid-type continuously variable transmission mode S, $n_o(HG)$ is output speed in the hydraulic-gear hybrid transmission mode HG, $n_o(GS)$ is output speed in the gear-rhombic pyramid hybrid transmission mode GS, $n_o(HS1)$ is output speed in the hydraulic-rhombic pyramid series hybrid transmission mode HS1, $n_o$(HS2) is output speed in the hydraulic-rhombic pyramid parallel hybrid transmission mode HS2, $n_o$(HSG) is output speed in the hydraulic-rhombic pyramid-gear hybrid transmission mode HSG, $n_1$ is engine speed, $k_1$ is planetary gear characteristic parameter of the front planetary gear mechanism, $k_2$ is planetary gear characteristic parameter of the rear planetary gear mechanism, e is displacement ratio of the hydraulic transmission mechanism, is is transmission ratio of the rhombic pyramid-type continuously variable transmission mechanism, $i_1$ is transmission ratio of the first gear pair 1-4, $i_2$ is transmission ratio of the second gear pair 3-6, $i_3$ is transmission ratio of the third gear pair 4-4, $i_4$ is transmission ratio of the fourth gear pair 4-8, and $i_5$ is transmission ratio of the fifth gear pair 5-5.

Figure 2:
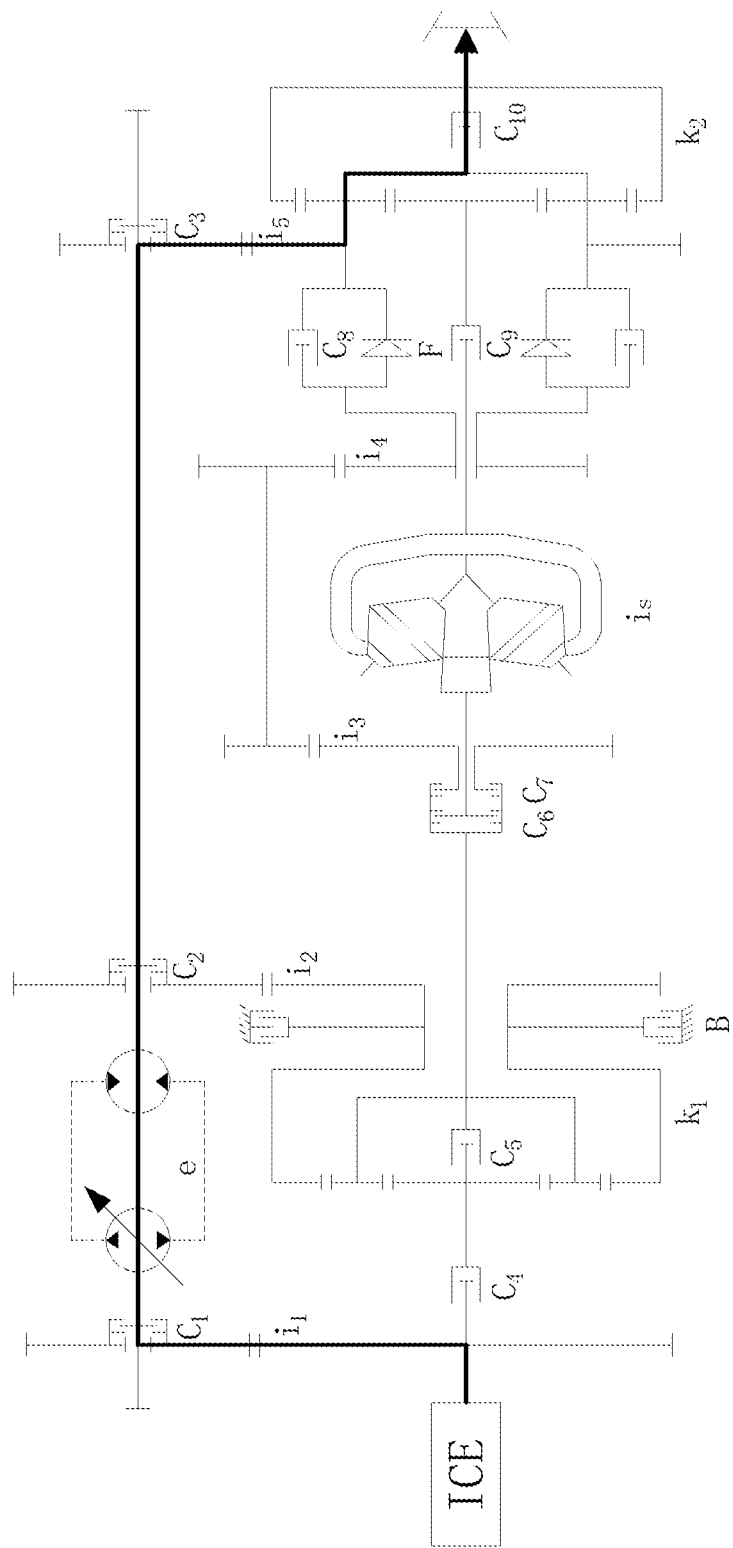
FIG. 2 is a schematic diagram showing the power flow in a hydraulic transmission mode H1 according to the present invention.

The hydraulic transmission mode H1 is shown in FIG. 2, wherein only the first clutch $C_1$ 2-2, the third clutch $C_3$ 2-7, and the tenth clutch $C_{10}$ 5-1 are engaged while the other clutches and brakes are disengaged. The engine power transmitted by the input shaft 1-2 passes through the first gear pair 1-4 to drive the variable displacement hydraulic pump 2-3 to work, thereby forcing the fixed displacement hydraulic motor 2-4 to rotate. The power output by the fixed displacement hydraulic motor 2-4 is transmitted through the fifth gear pair 5-5 to the rear planetary gear-planet carrier 5-3. The rear planetary gear mechanism 5 is fixedly connected as a whole, and the power is output from the output assembly 6.

Figure 3:
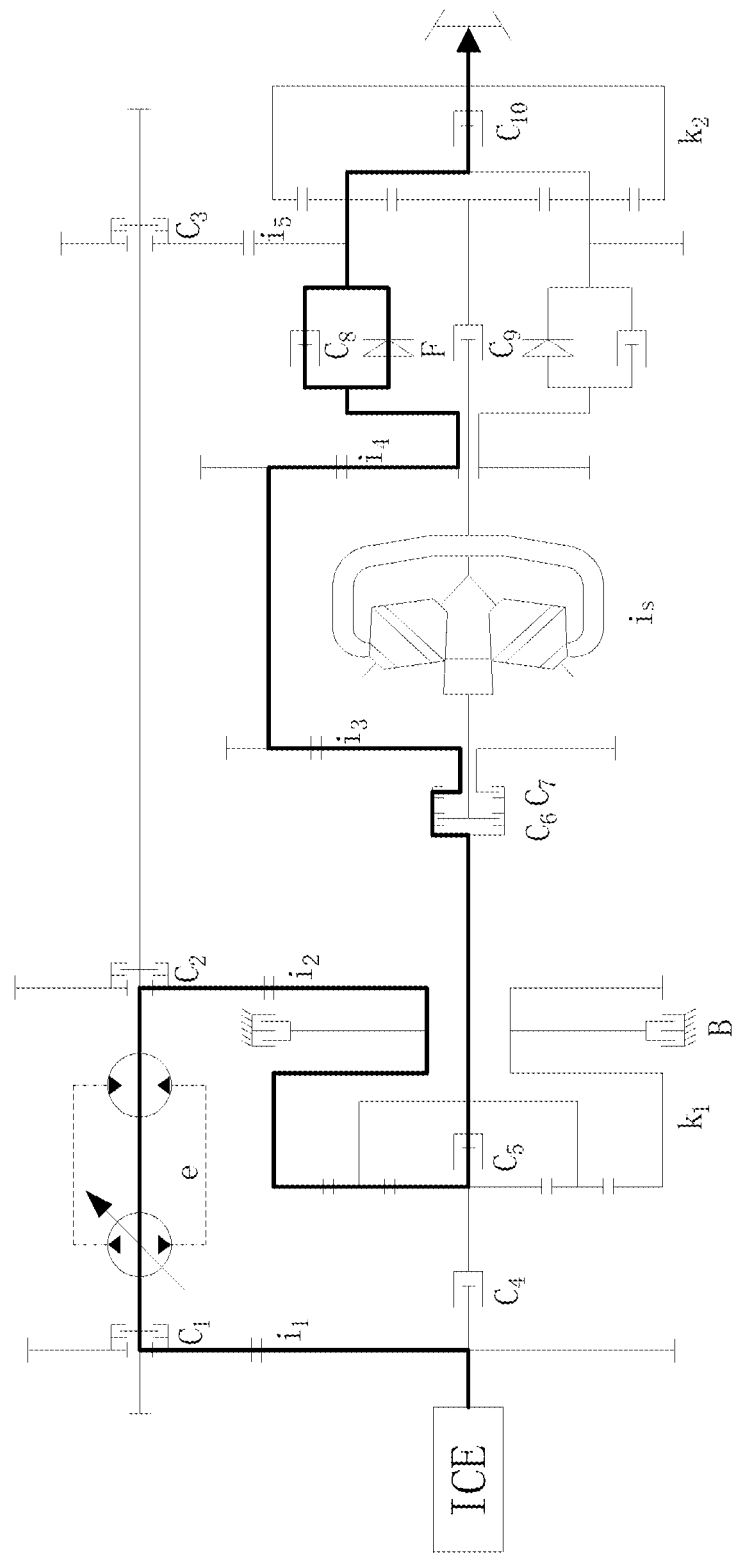
FIG. 3 is a schematic diagram showing the power flow in a hydraulic transmission mode H2 according to the present invention.

The hydraulic transmission mode H2 is shown in FIG. 3, wherein only the first clutch $C_1$ 2-2, the second clutch $C_2$ 2-6, the fifth clutch $C_5$ 3-2, the seventh clutch $C_7$ 4-2, the eighth clutch $C_8$ 4-12, and the tenth clutch $C_{10}$ 5-1 are engaged while the other clutches and brakes are disengaged. The one-way clutch F 4-11 is arranged in a direction so that the one-way clutch F 4-11 and the eighth clutch $C_8$ 4-12 jointly transmit a forward torque. In this case, the engine power transmitted by the input shaft 1-2 passes through the first gear pair 1-4 to drive the variable displacement hydraulic pump 2-3 to work, thereby forcing the fixed displacement hydraulic motor 2-4 to rotate. The power output by the fixed displacement hydraulic motor 2-4 is transmitted through the second gear pair 3-6 to the front planetary gear-ring gear 3-4. The front planetary gear mechanism 3 is fixedly connected as a whole, and the power is transmitted through the third gear pair 4-4, the central shaft 4-6, and the fourth gear pair 4-8 to the rear planetary gear-planet carrier 5-3. The rear planetary gear mechanism 5 is fixedly connected as a whole, and the power is output from the output assembly 6.

Figure 4:
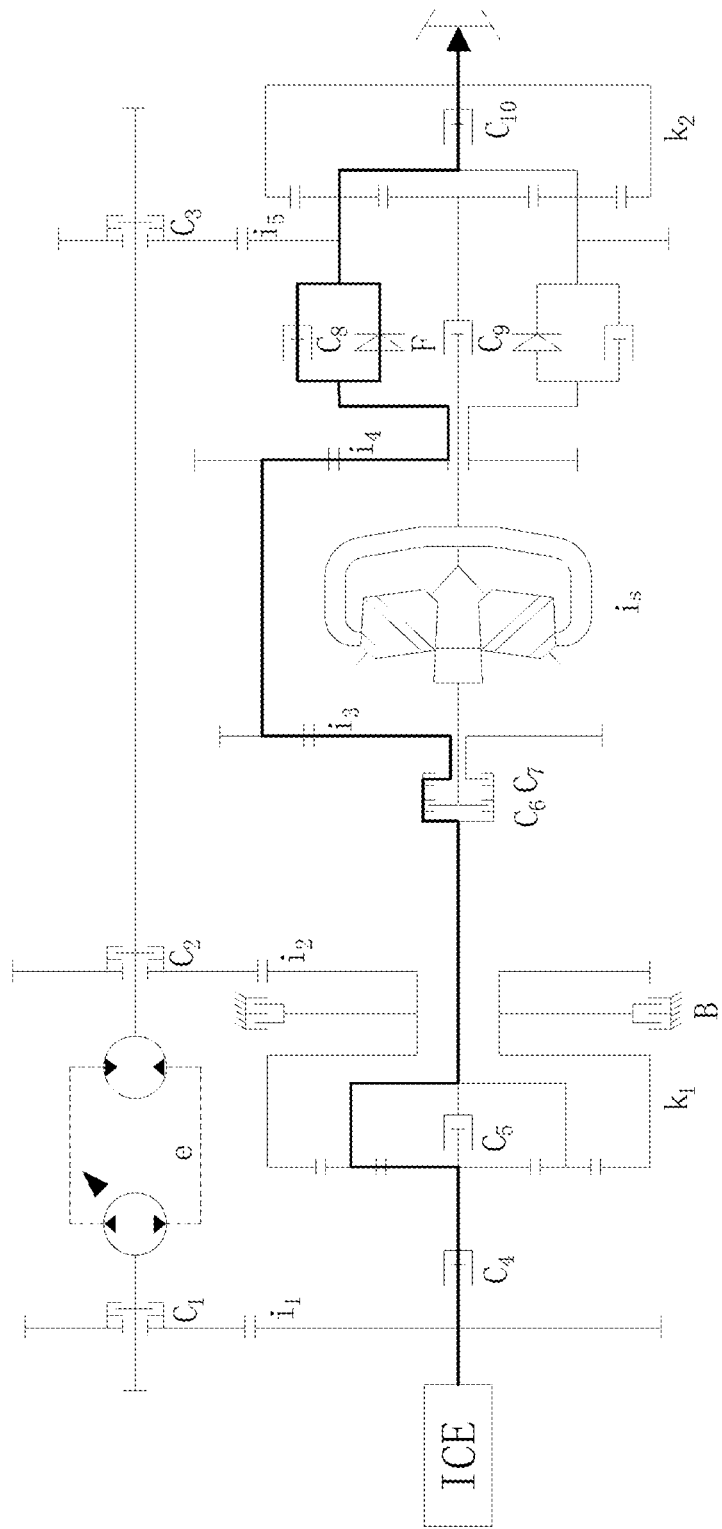
FIG. 4 is a schematic diagram showing the power flow in a gear transmission mode G according to the present invention.

The gear transmission mode G is shown in FIG. 4, wherein only the fourth clutch $C_4$ 1-3, the seventh clutch $C_7$ 4-2, the eighth clutch $C_8$ 4-12, the tenth clutch $C_{10}$ 5-1, and the brake B 3-5 are engaged while the other clutches are disengaged. The one-way clutch F 4-11 is arranged in a direction so that the one-way clutch F 4-11 and the eighth clutch $C_8$ 4-12 jointly transmit a forward torque. In this case, the engine power transmitted by the input shaft 1-2 passes through the fourth clutch $C_4$ 1-3 to drive the front planetary gear-sun gear 3-1. Since the front planetary gear-ring gear 3-4 is held by the brake B 3-5, the power is output by the front planetary gear-planet carrier 3-3 to the power output shaft 3-7 of the front planetary gear mechanism, and is then transmitted through the seventh clutch $C_7$ 4-2, the third gear pair 4-4, the central shaft 4-6, the fourth gear pair 4-8, the eighth clutch $C_8$ 4-12, and the one-way clutch F 4-11 to the rear planetary gear-planet carrier 5-3, wherein the eighth clutch $C_8$ 4-12 and the one-way clutch F 4-11 are connected in parallel. Since the tenth clutch $C_{10}$ 5-1 is engaged, the rear planetary gear mechanism 5 is fixedly connected as a whole, and the power is output from the output assembly 6.

Figure 5:
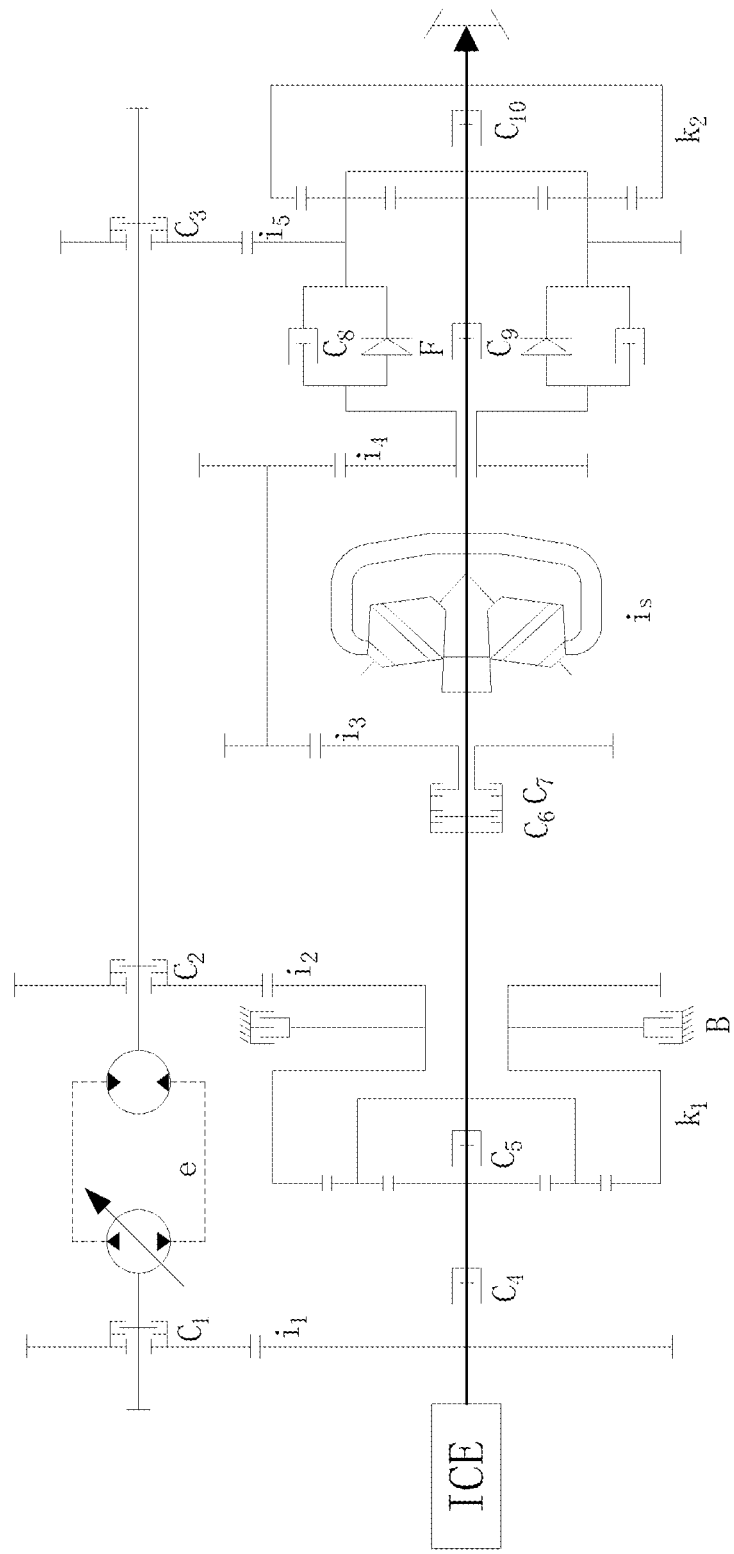
FIG. 5 is a schematic diagram showing the power flow in a rhombic pyramid-type continuously variable transmission mode S according to the present invention.

The rhombic pyramid-type continuously variable transmission mode S is shown in FIG. 5, wherein the fourth clutch $C_4$ 1-3, the fifth clutch $C_5$ 3-2, the sixth clutch $C_6$ 4-1, the ninth clutch $C_9$ 4-10, and the tenth clutch $C_{10}$ 5-1 are engaged while the other clutches and brakes are disengaged. The engine power is transmitted through the input shaft 1-2 to the sun gear 3-1 of the front planetary gear mechanism. The front planetary gear mechanism 3 is fixedly connected as a whole, and the engine power is transmitted through the front planetary gear mechanism 3 to the power input shaft 4-3 of the rhombic pyramid-type continuously variable transmission mechanism to drive the rhombic pyramid-type continuously variable transmission 4-5. The rhombic pyramid-type continuously variable transmission 4-5 realizes stepless speed variation by changing the working diameter of the rhombic pyramid in contact with two sides of the drive and driven pulleys. The power output by the rhombic pyramid-type continuously variable transmission is transmitted through the power output shaft 4-7 of the rhombic pyramid-type continuously variable transmission mechanism to the rear planetary gear-sun gear 5-2. The rear planetary gear mechanism 5 is fixedly connected as a whole, and the power is output from the output assembly 6.

Figure 6:
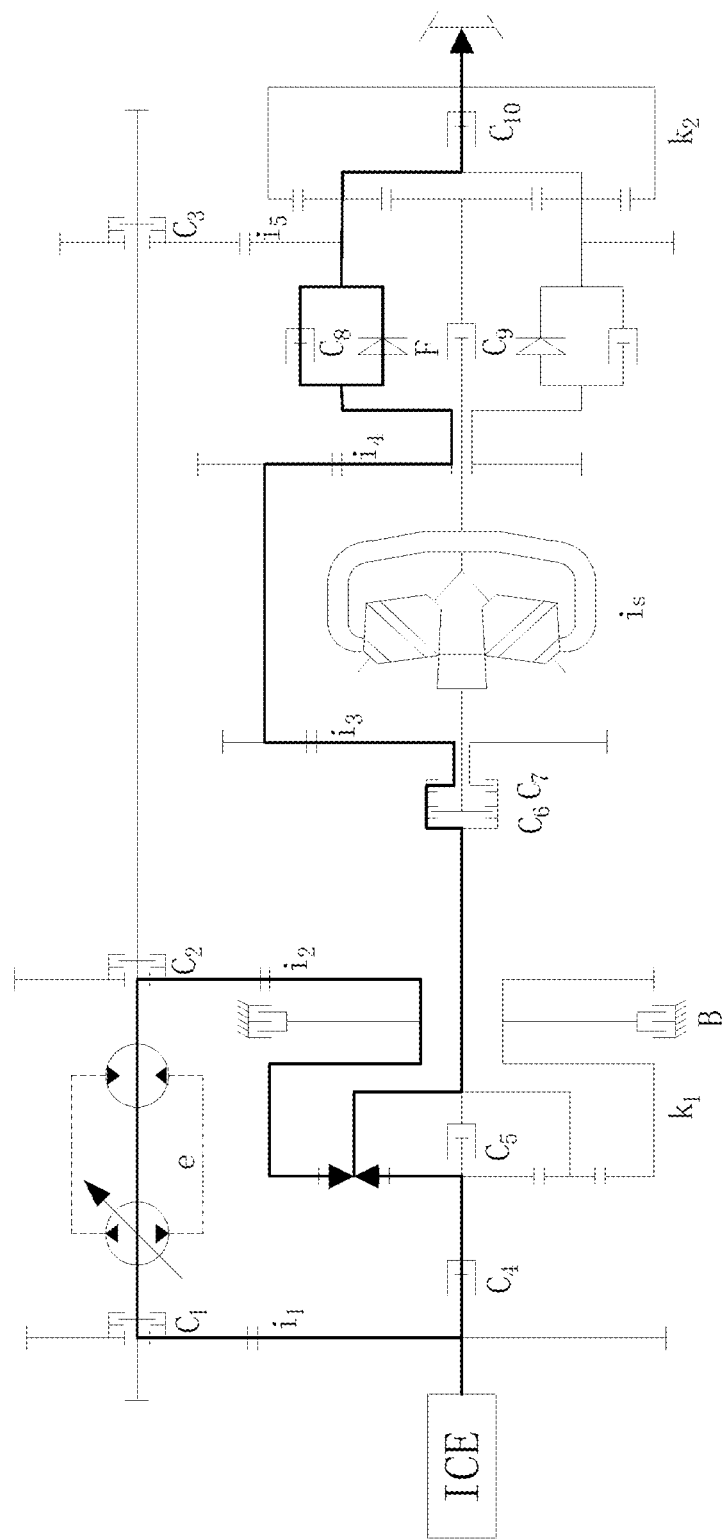
FIG. 6 is a schematic diagram showing the power flow in hydraulic-gear hybrid transmission HG according to the present invention.

The hydraulic-gear hybrid transmission mode HG is shown in FIG. 6, wherein only the first clutch $C_1$ 2-2, the second clutch $C_2$ 2-6, the fourth clutch $C_4$ 1-3, the seventh clutch $C_7$ 4-2, the eighth clutch $C_8$ 4-12, and the tenth clutch $C_{10}$ 5-1 are engaged while the other clutches and brakes are disengaged. The one-way clutch F 4-11 is arranged in a direction so that the one-way clutch F 4-11 and the eighth clutch $C_8$ 4-12 jointly transmit a forward torque. In this case, the engine power transmitted by the input shaft 1-2 is split into two parts. One part of the power is directly transmitted to the front planetary gear-sun gear 3-1. The other part of the power is transmitted through the first gear pair 1-4 to the hydraulic transmission input shaft 2-1 to drive the variable displacement hydraulic pump 2-3, thereby forcing the fixed displacement hydraulic motor 2-4 to rotate. The power output by the fixed displacement hydraulic motor 2-4 is transmitted through the hydraulic transmission output shaft 2-5 and the second gear pair 3-6 to the front planetary gear-ring gear 3-4. The two parts of the power are converged at the front planetary gear-planet carrier 3-3 and then transmitted through the power output shaft 3-7 of the front planetary gear mechanism, the third gear pair 4-4, the central shaft 4-6, and the fourth gear pair 4-8 to the rear planetary gear-planet carrier 5-3. The rear planetary gear mechanism 5 is fixedly connected as a whole, and the power is output from the output assembly 6.

Figure 7:
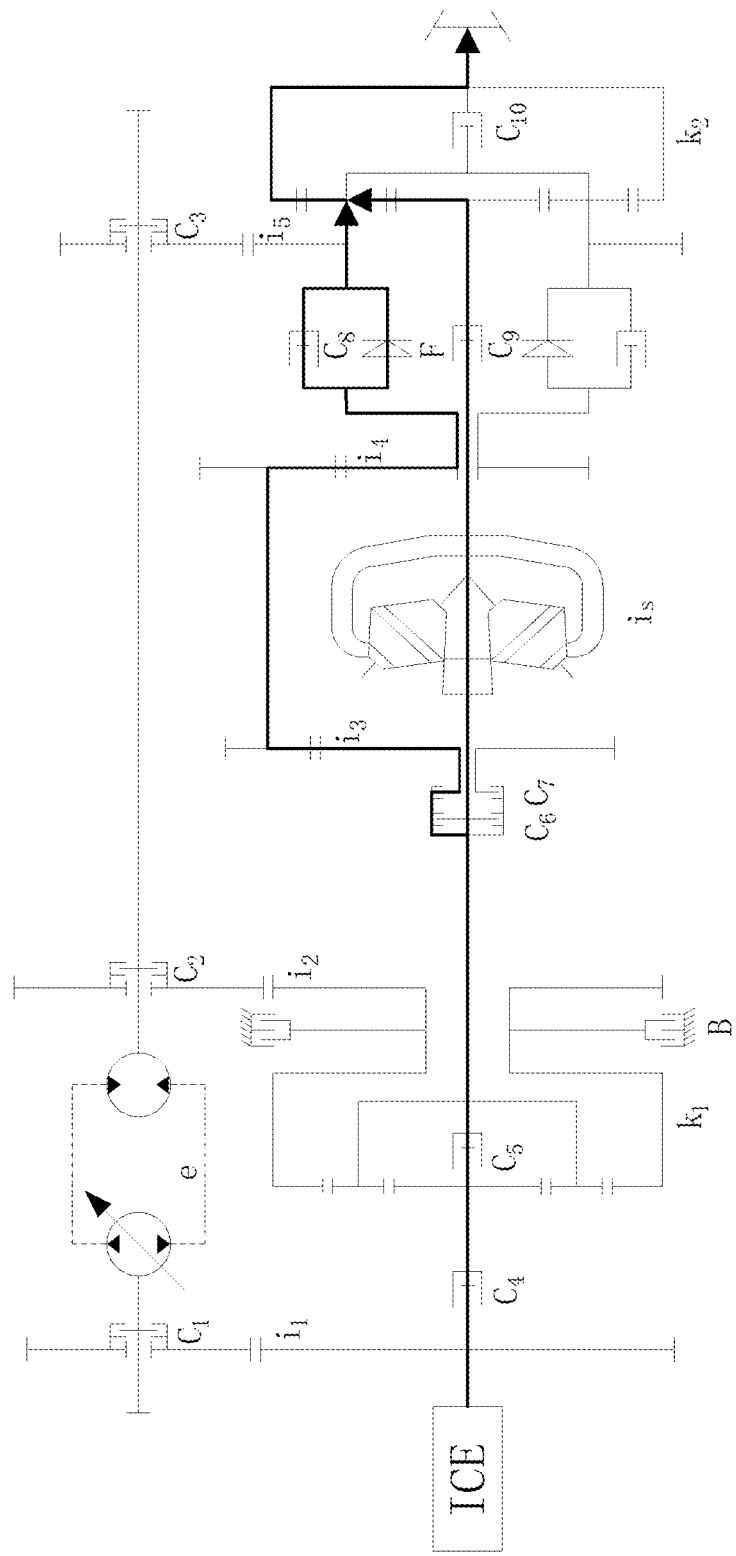
FIG. 7 is a schematic diagram showing the power flow in gear-rhombic pyramid hybrid transmission GS according to the present invention.

The gear-rhombic pyramid hybrid transmission mode GS is shown in FIG. 7, wherein only the fourth clutch $C_4$ 1-3, the fifth clutch $C_5$ 3-2, the sixth clutch $C_6$ 4-1, the seventh clutch $C_7$ 4-2, the eighth clutch $C_8$ 4-12, and the ninth clutch $C_9$ 4-10 are engaged while the other clutches and brakes are disengaged. The one-way clutch F 4-11 is arranged in a direction so that the one-way clutch F 4-11 and the eighth clutch $C_8$ 4-12 jointly transmit a forward torque. The front planetary gear mechanism 3 is fixedly connected as a whole, and the engine power transmitted by the input shaft 1-2 passes through the front planetary gear mechanism 3 and is split into two parts. One part of the power is transmitted through the power output shaft 3-7 of the front planetary gear mechanism, the third gear pair 4-4, the central shaft 4-6, and the fourth gear pair 4-8 to the rear planetary gear-planet carrier 5-3. The other part of the power is transmitted through the power input shaft 4-3 of the rhombic pyramid-type continuously variable transmission mechanism to drive the rhombic pyramid-type continuously variable transmission 4-5. The rhombic pyramid-type continuously variable transmission 4-5 realizes stepless speed variation by changing the working diameter of the rhombic pyramid in contact with two sides of the drive and driven pulleys. The power output by the rhombic pyramid-type continuously variable transmission is transmitted through the power output shaft 4-7 of the rhombic pyramid-type continuously variable transmission mechanism to the rear planetary gear-sun gear 5-2. The two parts of the power are converged at the rear planetary gear-ring gear 5-4 and then output from the output assembly 6.

Figure 8:
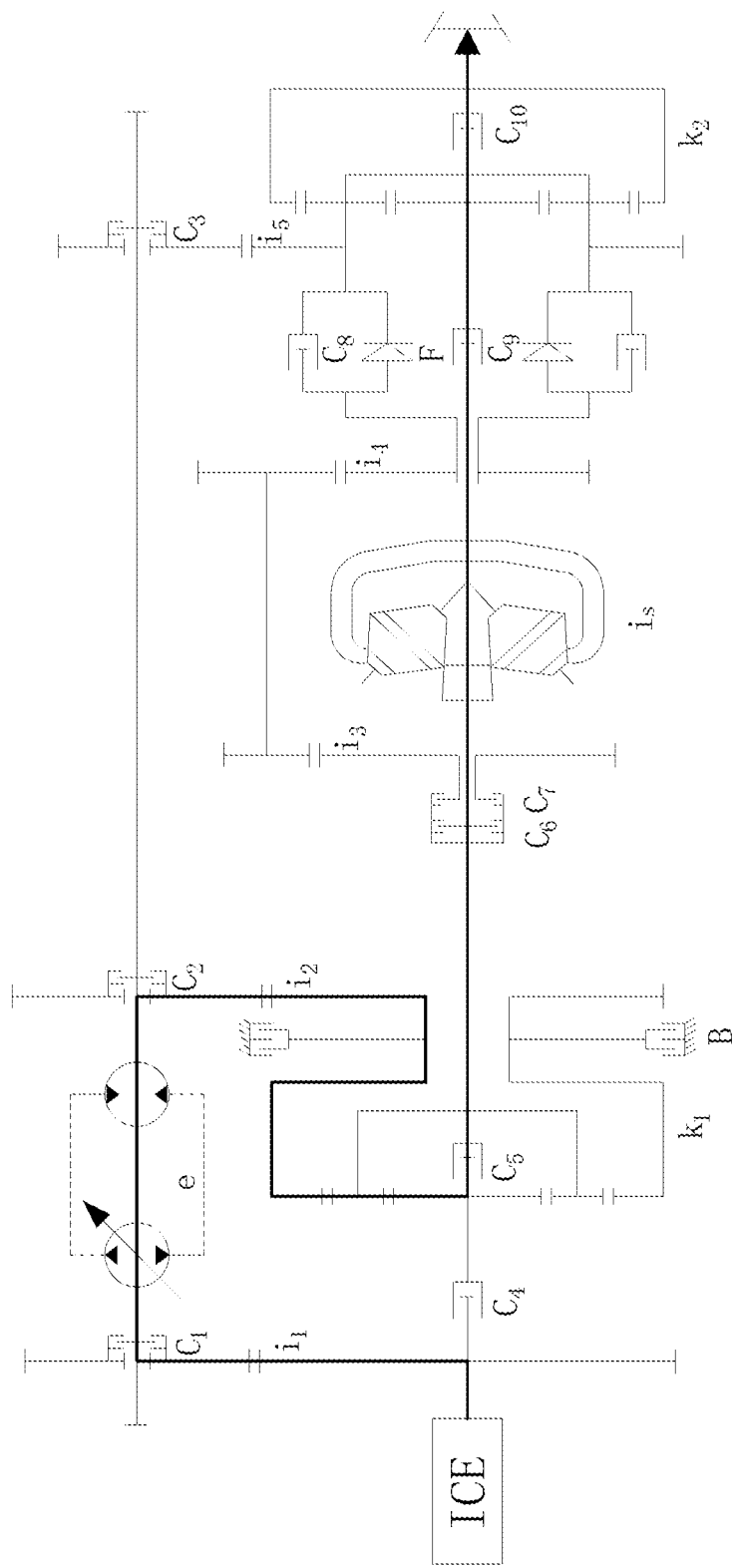
FIG. 8 is a schematic diagram showing the power flow in hydraulic-rhombic pyramid series hybrid transmission HS1 according to the present invention.

The hydraulic-rhombic pyramid series transmission mode HS1 is shown in FIG. 8, wherein only the first clutch $C_1$ 2-2, the second clutch $C_2$ 2-6, the fifth clutch $C_5$ 3-2, the sixth clutch $C_6$ 4-1, the ninth clutch $C_9$ 4-10, and the tenth clutch $C_{10}$ 5-1 are engaged while the other clutches and brakes are disengaged. The engine power transmitted by the input shaft 1-2 passes through the first gear pair 1-4 to the hydraulic transmission input shaft 2-1 to drive the variable displacement hydraulic pump 2-3, thereby forcing the fixed displacement hydraulic motor 2-4 to rotate. The power output by the fixed displacement hydraulic motor 2-4 is transmitted through the hydraulic transmission output shaft 2-5 and the second gear pair 3-6 to the front planetary gear-ring gear 3-4. The front planetary gear mechanism is fixedly connected as a whole, and the power is transmitted through the power input shaft 4-3 of the rhombic pyramid-type continuously variable transmission mechanism to drive the rhombic pyramid-type continuously variable transmission 4-5. The rhombic pyramid-type continuously variable transmission 4-5 realizes stepless speed variation by changing the working diameter of the rhombic pyramid in contact with two sides of the drive and driven pulleys. The power output by the rhombic pyramid-type continuously variable transmission is transmitted through the power output shaft 4-7 of the rhombic pyramid-type continuously variable transmission mechanism to the rear planetary gear-sun gear 5-2. The rear planetary gear mechanism 5 is fixedly connected as a whole, and the power is output from the output assembly 6.

Figure 9:
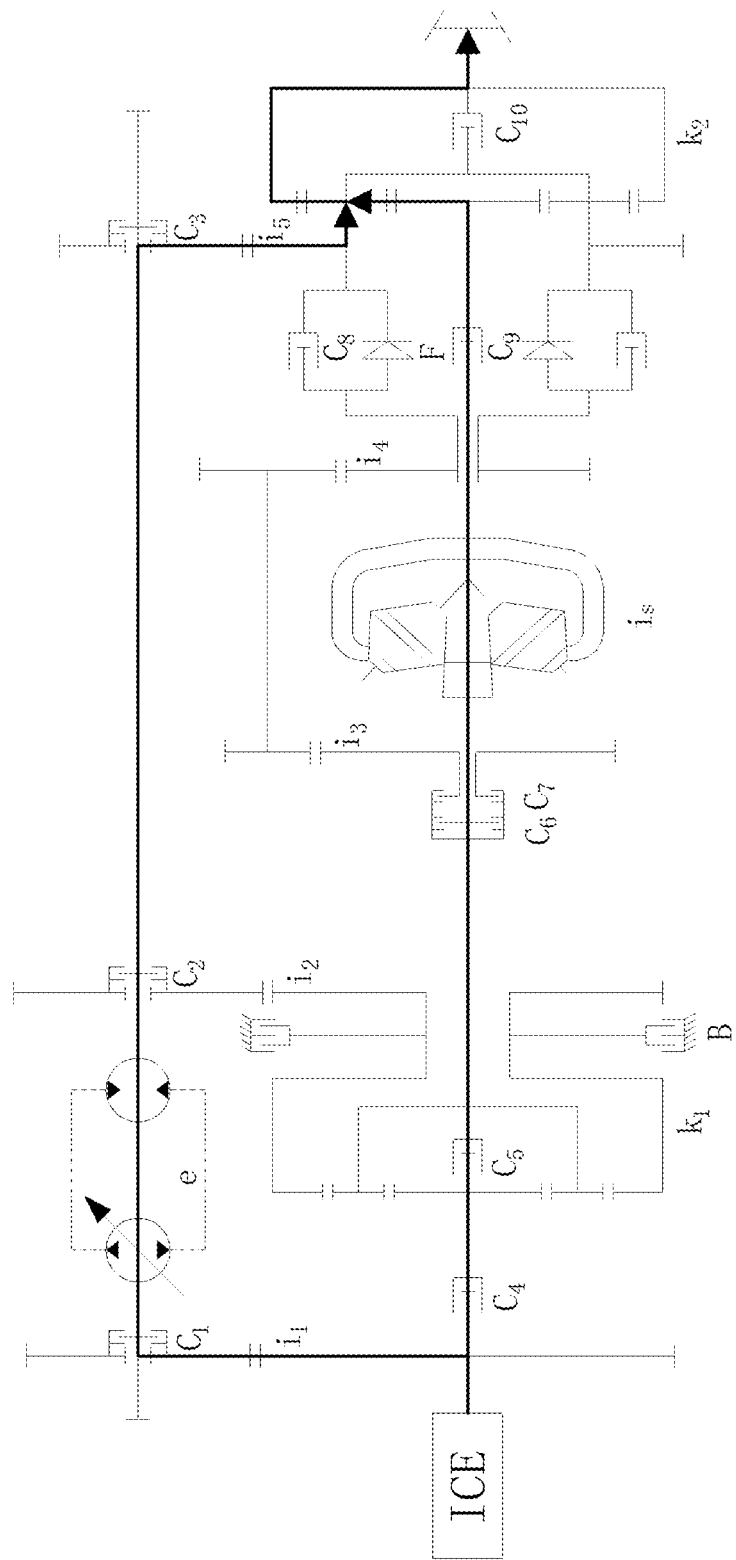
FIG. 9 is a schematic diagram showing the power flow in hydraulic-rhombic pyramid parallel hybrid transmission HS2 according to the present invention.

The hydraulic-rhombic pyramid parallel transmission mode HS2 is shown in FIG. 9, wherein only the first clutch $C_1$ 2-2, the third clutch $C_3$ 2-7, the fourth clutch $C_4$ 1-3, the fifth clutch $C_5$ 3-2, the sixth clutch $C_6$ 4-1, and the ninth clutch $C_9$ 4-10 are engaged while the other clutches and brakes are disengaged. The engine power transmitted by the input shaft 1-2 is split into two parts. One part of the power is transmitted through the first gear pair 1-4 to the hydraulic transmission input shaft 2-1 to drive the variable displacement hydraulic pump 2-3, thereby forcing the fixed displacement hydraulic motor 2-4 to rotate. The power output by the fixed displacement hydraulic motor 2-4 is transmitted through the hydraulic transmission output shaft 2-5 and the fifth gear pair 5-5 to the rear planetary gear-planet carrier 5-3. The other part of the power is transmitted through the front planetary gear mechanism 3 that is fixedly connected as a whole to the power input shaft 4-3 of the rhombic pyramid-type continuously variable transmission mechanism, and the power input shaft 4-3 of the rhombic pyramid-type continuously variable transmission mechanism drives the rhombic pyramid-type continuously variable transmission 4-5. The rhombic pyramid-type continuously variable transmission 4-5 realizes stepless speed variation by changing the working diameter of the rhombic pyramid in contact with two sides of the drive and driven pulleys. The power output by the rhombic pyramid-type continuously variable transmission is transmitted through the power output shaft 4-7 of the rhombic pyramid-type continuously variable transmission mechanism to the rear planetary gear-sun gear 5-2. The two parts of the power are converged at the rear planetary gear-ring gear 5-4 and then output from the output assembly 6.

Figure 10:
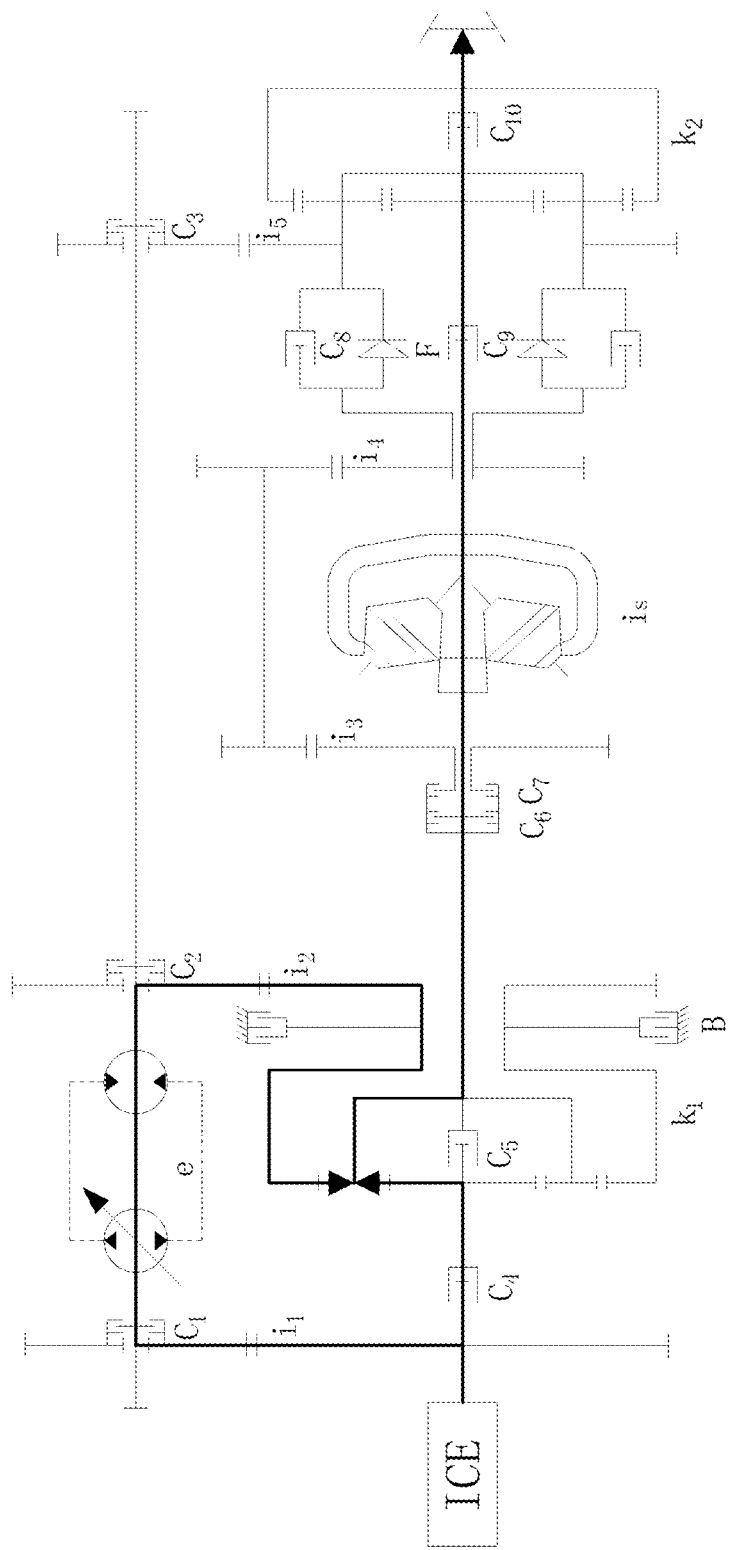
FIG. 10 is a schematic diagram showing the power flow in hydraulic-rhombic pyramid-gear hybrid transmission HSG according to the present invention.

The hydraulic-rhombic pyramid-gear hybrid transmission mode HSG is shown in FIG. 10, wherein only the first clutch $C_1$ 2-2, the second clutch $C_2$ 2-6, the fourth clutch $C_4$ 1-3, the sixth clutch $C_6$ 4-1, the ninth clutch $C_9$ 4-10, and the tenth clutch $C_{10}$ 5-1 are engaged while the other clutches and brakes are disengaged. The engine power transmitted by the input shaft 1-2 is split into two parts. One part of the power is directly transmitted to the front planetary gear-sun gear 3-1. The other part of the power is transmitted through the first gear pair 1-4 to the hydraulic transmission input shaft 2-1 to drive the variable displacement hydraulic pump 2-3, thereby forcing the fixed displacement hydraulic motor 2-4 to rotate. The power output by the fixed displacement hydraulic motor 2-4 is transmitted through the hydraulic transmission output shaft 2-5 and the second gear pair 3-6 to the front planetary gear-ring gear 3-4. The two parts of the power are converged at the front planetary gear-planet carrier 3-3 and then transmitted through the power input shaft 4-3 of the rhombic pyramid-type continuously variable transmission mechanism to drive the rhombic pyramid-type continuously variable transmission 4-5. The rhombic pyramid-type continuously variable transmission 4-5 realizes stepless speed variation by changing the working diameter of the rhombic pyramid in contact with two sides of the drive and driven pulleys. The power output by the rhombic pyramid-type continuously variable transmission is transmitted through the power output shaft 4-7 of the rhombic pyramid-type continuously variable transmission mechanism to the rear planetary gear-sun gear 5-2. The rear planetary gear mechanism 5 is fixedly connected as a whole, and the power is output from the output assembly 6.

Figure 11:
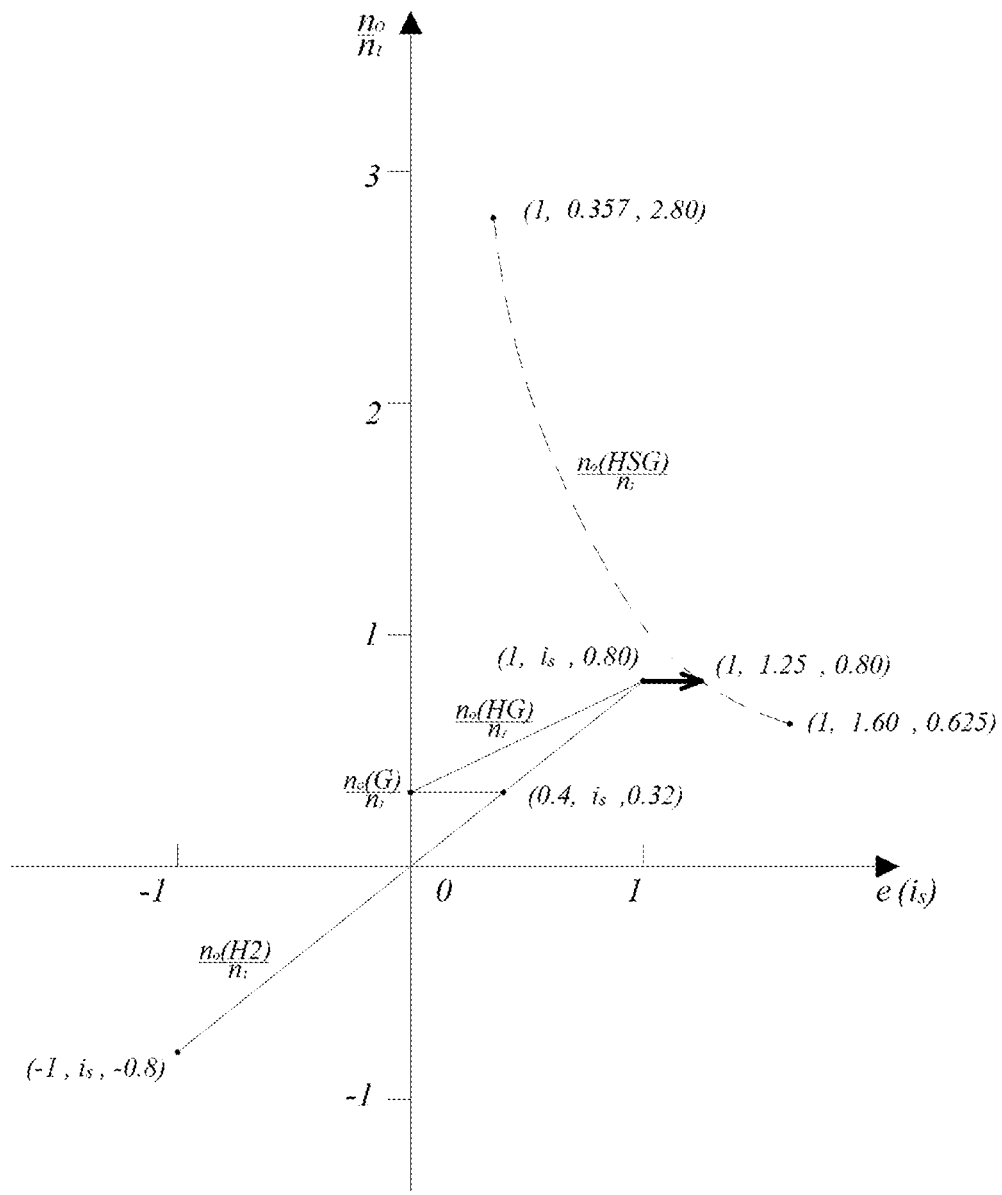
FIG. 11 is a diagram showing relationships between output speed and input speed in a mode switching process (H2→G→HG→HSG) according to the present invention.

As shown in FIG. 11, stepless speed regulation of switching between the transmission modes "hydraulic transmission H2→gear transmission G→hydraulic-gear hybrid transmission HG→hydraulic-rhombic pyramid-gear HSG" is provided by adjusting the displacement ratio of the hydraulic transmission mechanism 2, adjusting the transmission ratio of the rhombic pyramid-type continuously variable transmission mechanism 4, and selectively controlling engagement of the clutch assembly and the brake assembly. The hydraulic mode H2 is adopted for startup, and the output speed increases linearly with the increase of the displacement ratio e of the hydraulic transmission mechanism. When e=−1, a negative maximum value is reached in the hydraulic transmission mode H2. When e=1, a positive maximum value is reached in the hydraulic transmission mode H2. When e∈[$n_0$(H2)=$n_0$(G)], the mode can be synchronously switched to the gear transmission mode G, and the gear transmission mode G is transmission with a constant transmission ratio. When e=[$n_0$(G)=$n_0$(HG)], the mode can be synchronously switched to the hydraulic-gear hybrid transmission mode HG. When e∈[$n_0$(HG)=$n_0$(HSG)], e∈[0, 1], and is falls in a determined transmission ratio range, the mode can be synchronously switched to the hydraulic-rhombic pyramid-gear mode HSG.

Figure 12:
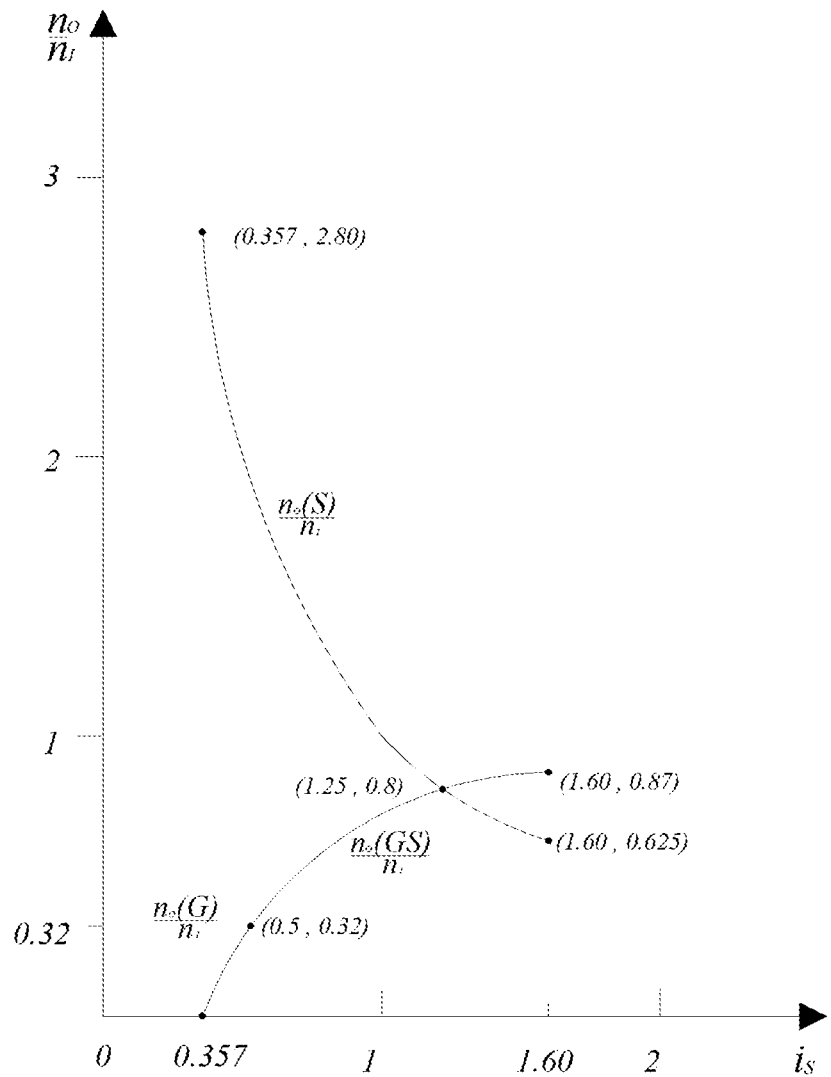
FIG. 12 is a diagram showing relationships between output speed and input speed in a mode switching process (GS→S) according to the present invention.

As shown in FIG. 12, stepless speed regulation of switching between the transmission modes "gear-rhombic pyramid hybrid transmission GS→rhombic pyramid-type continuously variable transmission S" is provided by adjusting the transmission ratio of the rhombic pyramid-type continuously variable transmission mechanism 4 and selectively controlling engagement of the clutch assembly and the brake assembly. The gear-rhombic pyramid hybrid transmission mode GS is adopted for startup. When the transmission ratio is of the rhombic pyramid-type continuously variable transmission changes from a minimum value to a maximum value, $n_0(GS)$ increases non-linearly. When $n_0(GS)=n_0(G)$ and is falls in a determined transmission ratio range, the gear-rhombic pyramid hybrid transmission mode GS can be synchronously switched to the gear transmission mode G, and the gear transmission mode G has a constant transmission ratio. When the transmission ratio of the rhombic pyramid-type continuously variable transmission satisfies $i_s \in [n_o(GS)=n_o(S)]$, the gear-rhombic pyramid hybrid transmission mode GS can be synchronously switched to the rhombic pyramid-type continuously variable transmission mode S. When the transmission ratio is of the rhombic pyramid-type continuously variable transmission changes from the maximum value to the minimum value, $n_o(S)$ increases non-linearly. The displacement ratio e of the hydraulic transmission mechanism has $n_o$ influence on changes in the transmission ratio of the transmission device during the mode switching process, and the transmission device implements stepless speed variation within the determined transmission ratio range only by changing is.

Figure 13:
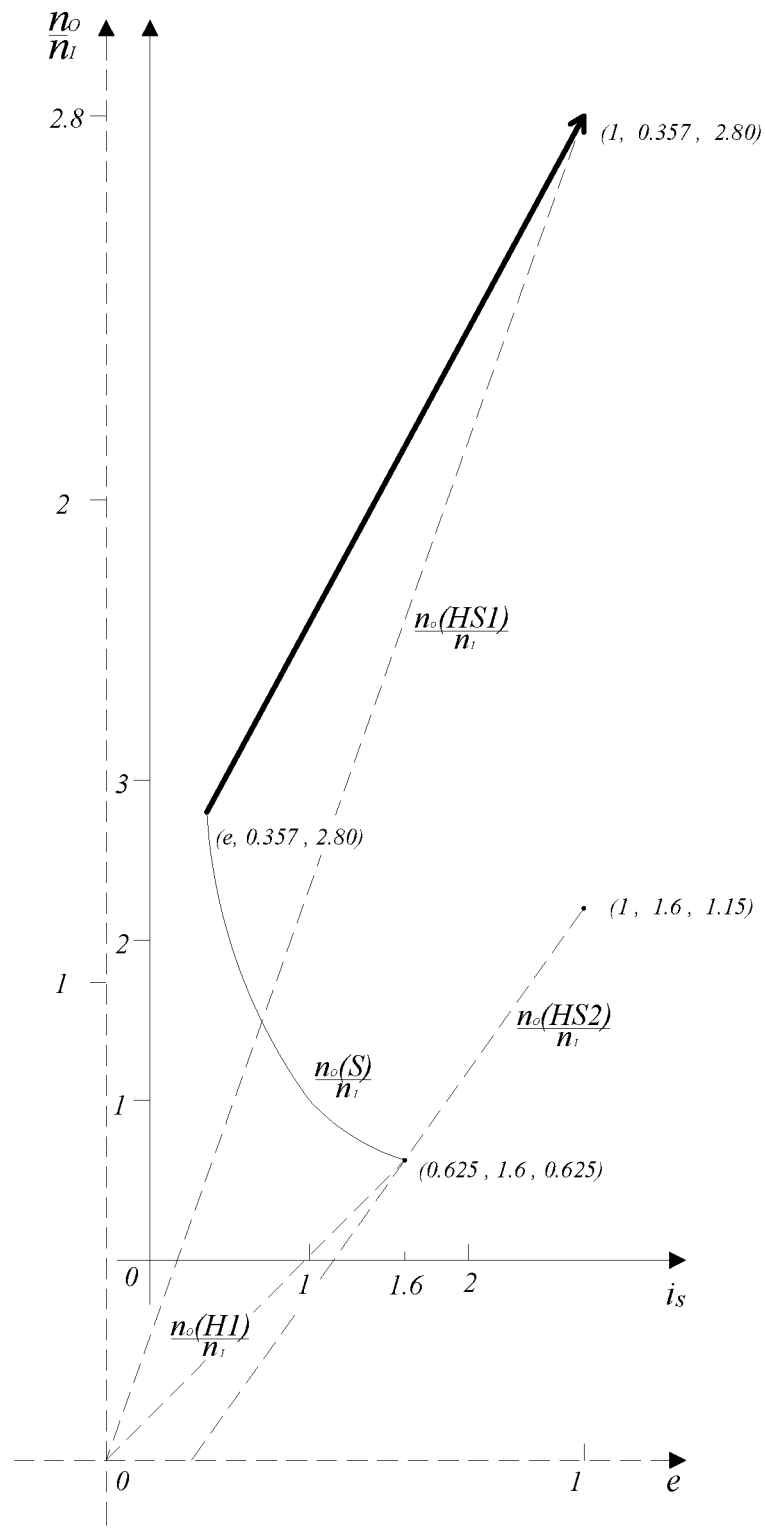
FIG. 13 is a diagram showing relationships between output speed and input speed in a mode switching process (H1→S→HS) according to the present invention.

As shown in FIG. 13, stepless speed regulation of switching between the transmission modes "hydraulic transmission H1→rhombic pyramid-type continuously variable transmission S→hydraulic-rhombic pyramid hybrid transmission HS" is provided by adjusting the displacement ratio of the hydraulic transmission mechanism 2, adjusting the transmission ratio of the rhombic pyramid-type continuously variable transmission mechanism 4, and selectively controlling engagement of the clutch assembly. The mode H1 is adopted for startup, and the output speed increases linearly with the increase of the displacement ratio e of the hydraulic transmission mechanism. When e=1, a positive maximum value is reached in the hydraulic transmission mode H1. When $e \cdot i_s \in [n_o(H1)=n_o(S)]$, $e \in [0, 1]$, and is falls in a determined transmission ratio range, the hydraulic transmission mode H1 can be synchronously switched to the rhombic pyramid-type continuously variable transmission mode S. When the transmission ratio is of the rhombic pyramid-type continuously variable transmission changes from a maximum value to a minimum value, $n_o(S)$ increases non-linearly. When $e \cdot i_s \in [n_o(S)=n_o(HS1)]$, $e \in [0, 1]$, and is falls in a determined transmission ratio range, the rhombic pyramid-type continuously variable transmission mode S can be synchronously switched to the hydraulic-rhombic pyramid hybrid transmission mode HS1. When $e \; i_s \in [n_o(S)=n_o(HS2)]$, $e \in [0, 1]$, and is falls in a determined transmission ratio range, the rhombic pyramid-type continuously variable transmission mode S can be synchronously switched to the hydraulic-rhombic pyramid hybrid transmission mode HS2. The output value of the hydraulic-rhombic pyramid hybrid transmission mode HS1 differs with the switching position, but the output speed decreases linearly with the decrease of the displacement ratio e of the hydraulic transmission mechanism.

Examples are given below for illustration of this embodiment:

The main parameters are: $i_1 i_2=1$, $i_3 i_4=1.25$, $i_1 i_5=1$, $k_1=1.5$, $k_2=2.5$, $i_s \in [0.357, 1.6]$.

In a first mode switching process: hydraulic transmission H2→gear transmission G→hydraulic-gear hybrid transmission HG→hydraulic-rhombic pyramid-gear HSG the output-input speed relationship in hydraulic transmission H2 is:

$$n_o(H2) = \frac{e}{i_1 i_2 i_3 i_4} n_I = 0.8 e n_I;$$

the output-input speed relationship in gear transmission G is:

$$n_o(G) = \frac{1}{(1+k_1)i_3 i_4} n_I = 0.32 n_I;$$

the output-input speed relationship in hydraulic-gear hybrid transmission HG is:

$$n_o(HG) = \frac{1+\frac{k_1 e}{i_1 i_2}}{(1+k_1)i_3 i_4} n_I = \frac{1+1.5e}{3.125} n_I;$$

the output-input speed relationship in hydraulic-rhombic pyramid-gear transmission HSG $$n_o(HSG) = \frac{1+\frac{k_1 e}{i_1 i_2}}{(1+k_1)i_s} n_I = \frac{1+1.5e}{2.5 i_s} n_I.$$

As shown in FIG. 11, the hydraulic transmission mode H2 is adopted for startup, and the output speed increases linearly with the increase of the displacement ratio e of the hydraulic transmission mechanism. When e=−1, a negative maximum value $-0.8n_1$ is reached in the mode H2. When e=1, a positive maximum value $0.8n_1$ is reached in the hydraulic transmission mode H. When e=0.4, the hydraulic transmission mode H2 can be synchronously switched to the gear transmission mode G, and the gear transmission has a constant transmission ratio. The gear transmission mode G can also be synchronously switched to the hydraulic-gear hybrid transmission mode HG, and the output speed increases linearly with the increase of e. When e=1, the positive maximum value $0.8n_1$ is reached, and the hydraulic-gear hybrid transmission mode HG can be synchronously switched to the hydraulic-rhombic pyramid-gear mode HSG. When is changes from 1.6 to 0.357, $n_o(HSG)$ increases non-linearly, and the transmission device implements stepless speed variation within a range of $[0, 2.80]n_1$ by changing e and is.

In a second mode switching process: gear-rhombic pyramid hybrid transmission GS→rhombic pyramid-type continuously variable transmission S the output-input speed relationship in gear transmission G is:

$$n_o(G) = \frac{1}{(1+k_1)i_3 i_4} n_I = 0.32 n_I;$$

the output-input speed relationship in rhombic pyramid-type continuously variable transmission S is:

$$n_o(S) = \frac{1}{n_s} n_I;$$

the output-input speed relationship in gear-rhombic pyramid hybrid transmission GS is:

$$n_o(GS) = \frac{\frac{(1+k_2)}{i_3 i_4} - \frac{1}{i_s}}{k_2} n_I = \frac{2.8 - \frac{1}{i_s}}{2.5} n_I.$$

As shown in FIG. 12, the gear-rhombic pyramid hybrid transmission mode GS is adopted for startup. When the transmission ratio is of the rhombic pyramid-type continuously variable transmission changes from 0.357 to 1.6, $n_o(GS)$ increases non-linearly from 0 to $0.87n_1$. When the transmission ratio is of the rhombic pyramid-type continuously variable transmission is 0.5, the gear-rhombic pyramid hybrid transmission mode GS can be synchronously switched to the gear transmission mode G, and the gear transmission mode G is transmission with a constant transmission ratio. When the transmission ratio is of the rhombic pyramid-type continuously variable transmission is 1.25, the gear-rhombic pyramid hybrid transmission mode GS can be synchronously switched to the rhombic pyramid-type continuously variable transmission mode S, wherein when is changes from 1.6 to 0.357, $n_o(S)$ increases non-linearly from $0.625n_1$ to $2.80n_1$. The displacement ratio e of the hydraulic transmission mechanism has $n_o$ influence on changes in the transmission ratio of the transmission device during the mode switching process, and the transmission device implements stepless speed variation within a range of $[0, 2.80]n_1$ only by changing is.

In a third mode switching process: hydraulic transmission H1→rhombic pyramid-type continuously variable transmission S→hydraulic-rhombic pyramid hybrid transmission HS the output-input speed relationship in hydraulic transmission H1 is:

$$n_o(H1) = \frac{e}{i_1 i_5} n_I = e n_I;$$

the output-input speed relationship in rhombic pyramid-type continuously variable transmission S is:

$$n_o(S) = \frac{1}{i_s} n_I;$$

the output-input speed relationship in hydraulic-rhombic pyramid series hybrid transmission HS1 is:

$$n_0(HS1) = \frac{e}{i_1 i_2 i_s} n_I = \frac{e}{i_s} n_I;$$

the output-input speed relationship in hydraulic-rhombic pyramid parallel hybrid transmission HS2 is:

$$n_o(HS2) = \frac{\frac{(1+k_2)e}{i_1 i_5} - \frac{1}{i_s}}{k_2} n_I = \frac{3.5e - \frac{1}{i_s}}{2.5} n_I.$$

As shown in FIG. 13, the mode H1 is adopted for startup, and the output speed increases linearly with the increase of the displacement ratio e of the hydraulic transmission mechanism. When e=1, a positive maximum value $1.0n_1$ is reached in the mode H. When $e \cdot i_s = 1.0$, $e \in [0, 1]$, and $i_s \in [0.357, 1.6]$, the mode H can be synchronously switched to the mode S and can also be synchronously switched to the mode HS2. In the case that the mode H is synchronously switched to the mode S, when is changes from 1.6 to 0.357, $n_o(S)$ increases non-linearly from $0.625n_1$ to $2.80n_1$. When e=1, the mode S can be synchronously switched to the mode HS1. When $e \cdot i_s = 1.0$, $e \in [0, 1]$, and $i_s \in [0.357, 1.6]$, the mode S can be synchronously switched to the mode HS2. The output value of the hydraulic-rhombic pyramid series or parallel hybrid transmission mode differs with the switching position, but the output speed decreases linearly with the decrease of the displacement ratio e of the hydraulic transmission mechanism.

The rhombic pyramid-type continuously variable transmission mostly adopts a pressurizing device to ensure that the transmission parts do not receive excessive pressing forces, thereby improving the transmission efficiency and the service life, wherein the transmission efficiency is generally maintained in a range of 85%-93%. The hydraulic components have large specific power but low transmission efficiency, which is generally in a range of 80%-90%. If the transmission efficiency of the rhombic pyramid-type continuously variable transmission is 90% and the total efficiency of the hydraulic components is 80%, when the rhombic pyramid-hydraulic series mode HS1 is adopted, the system transmission efficiency is 90%×80%=72%. When the rhombic pyramid-hydraulic parallel mode HS2 is adopted, if the two paths have the same input power, the system transmission efficiency is 0.5×90%+0.5×80%=85%, which is increased by 13% as compared with the hydraulic-rhombic pyramid series transmission HS1. Assuming that 9/10 of the input power passes through the rhombic pyramid path and 1/10 of the input power passes through the hydraulic path, the system transmission efficiency is 0.9×90%+0.1× 80%=89%, which is increased by 17% as compared with the hydraulic-rhombic pyramid series transmission HS1. Therefore, the mode HS2 can effectively improve the system transmission efficiency, but its speed regulation range is limited, and the output speed $n_o(HS2)$ changes within a forward speed regulation range of $[0, 1.12]n_1$, so that this mode is suitable for regional high-efficiency stepless speed regulation. Although the hydraulic-rhombic pyramid series transmission HS1 has low transmission efficiency, its speed regulation range is large and the output speed $n_o(HS1)$ changes within a range of $[0, 2.80]n_1$, so that this mode is suitable for non-linear stepless speed regulation within a large range.

It should be understood that although this specification is described in accordance with the embodiments, each embodiment does not merely include one independent technical solution. This narrative way of the specification is only for clarity, and persons skilled in the art should regard the specification as a whole. The technical solutions in the embodiments can also be appropriately combined to form other implementations that can be understood by persons skilled in the art.

The above descriptions are merely practical embodiments of the present invention, and are not intended to limit the protection scope of the present invention. Any equivalent embodiments or modifications made without departing from the spirit of the present invention shall fall within the protection scope of the present invention.

What is claimed is:

1. A gear-hydraulic-rhombic pyramid integrated multi-mode hybrid transmission device, comprising an input assembly, a hydraulic transmission mechanism, a front planetary gear mechanism, a rhombic pyramid-type continuously variable transmission mechanism, a rear planetary gear mechanism, an output assembly, a clutch assembly, and a brake assembly, wherein the clutch assembly connects an output end of the input assembly to an input end of the hydraulic transmission mechanism and an input end of the front planetary gear mechanism;

the clutch assembly connects an output end of the hydraulic transmission mechanism to the front planetary gear mechanism and the rear planetary gear mechanism;

the clutch assembly connects the front planetary gear mechanism to the rhombic pyramid-type continuously variable transmission mechanism, connects the rhombic pyramid-type continuously variable transmission mechanism to the rear planetary gear mechanism, and connects the rear planetary gear mechanism to the output assembly;

the clutch assembly and the brake assembly provide a continuous transmission ratio between the input assembly and the output assembly;

any one of or a combination of any two or three of transmission modes comprising hydraulic transmission, gear transmission, and rhombic pyramid-type continuously variable transmission is provided between the input assembly and the output assembly by adjusting a displacement ratio of the hydraulic transmission mechanism, adjusting a transmission ratio of the rhombic pyramid-type continuously variable transmission mechanism, and selectively controlling engagement of the clutch assembly and the brake assembly;

the clutch assembly comprises a first clutch, a second clutch, a third clutch, a fifth clutch, a seventh clutch, an eighth clutch, a one-way clutch, and a tenth clutch, wherein the first clutch is used for selectively connecting the input assembly to the input end of the hydraulic transmission mechanism;

the second clutch is used for selectively connecting the output end of the hydraulic transmission mechanism to a ring gear of the front planetary gear mechanism to achieve synchronous rotation;

the third clutch is used for selectively connecting the output end of the hydraulic transmission mechanism to a planet carrier of the rear planetary gear mechanism to achieve synchronous rotation;

the fifth clutch is used for selectively connecting a sun gear of the front planetary gear mechanism to a planet carrier of the front planetary gear mechanism to achieve synchronous rotation;

the seventh clutch is used for selectively connecting the planet carrier of the front planetary gear mechanism to a third gear pair to achieve synchronous rotation;

the eighth clutch is used for selectively connecting a fourth gear pair to the planet carrier of the rear planetary gear mechanism to achieve synchronous rotation;

the third gear pair is connected to the fourth gear pair;

the one-way clutch is used for controlling forward power transmission after the fourth gear pair is connected to the planet carrier of the rear planetary gear mechanism;

the tenth clutch is used for selectively connecting the planet carrier of the rear planetary gear mechanism to a ring gear of the rear planetary gear mechanism to achieve synchronous rotation; and different types of hydraulic transmission are provided between the input assembly and the output assembly by adjusting the displacement ratio of the hydraulic transmission mechanism and selectively controlling engagement of the first clutch, the third clutch, and the tenth clutch, or by adjusting the displacement ratio of the hydraulic transmission mechanism and selectively controlling engagement of the first clutch, the second clutch, the fifth clutch, the seventh clutch, the eighth clutch, the one-way clutch, and the tenth clutch.

2. The gear-hydraulic-rhombic pyramid integrated multi-mode hybrid transmission device according to claim 1, wherein the clutch assembly further comprises a fourth clutch, wherein the fourth clutch is used for selectively connecting the input assembly to the sun gear of the front planetary gear mechanism to achieve synchronous rotation;

the brake assembly comprises a brake, wherein the brake is used for selectively connecting the ring gear of the front planetary gear mechanism to a fixed member; and the gear transmission is provided between the input assembly and the output assembly by controlling engagement of the fourth clutch, the seventh clutch, the eighth clutch, the one-way clutch, the tenth clutch, and the brake.

3. The gear-hydraulic-rhombic pyramid integrated multi-mode hybrid transmission device according to claim 2, wherein the clutch assembly further comprises a sixth clutch and a ninth clutch, wherein the sixth clutch is used for selectively connecting the planet carrier of the front planetary gear mechanism to an input end of the rhombic pyramid-type continuously variable transmission mechanism to achieve synchronous rotation;

the ninth clutch is used for selectively connecting an output end of the rhombic pyramid-type continuously variable transmission mechanism to a sun gear of the rear planetary gear mechanism to achieve synchronous rotation; and the rhombic pyramid-type continuously variable transmission is provided between the input assembly and the output assembly by adjusting the transmission ratio of the rhombic pyramid-type continuously variable transmission mechanism and selectively controlling engagement of the fourth clutch, the fifth clutch, the sixth clutch, the ninth clutch, and the tenth clutch.

4. The gear-hydraulic-rhombic pyramid integrated multi-mode hybrid transmission device according to claim 3, wherein hydraulic-gear hybrid transmission is provided between the input assembly and the output assembly by adjusting the displacement ratio of the hydraulic transmission mechanism and selectively controlling engagement of the first clutch, the second clutch, the fourth clutch, the seventh clutch, the eighth clutch, the one-way clutch, and the tenth clutch;

gear-rhombic pyramid hybrid transmission is provided between the input assembly and the output assembly by adjusting the transmission ratio of the rhombic pyramid-type continuously variable transmission mechanism and selectively controlling engagement of the fourth clutch, the fifth clutch, the sixth clutch, the seventh clutch, the eighth clutch, the one-way clutch, and the ninth clutch; and different types of hydraulic-rhombic pyramid series-parallel hybrid transmission are provided between the input assembly and the output assembly by adjusting the displacement ratio of the hydraulic transmission mechanism, adjusting the transmission ratio of the rhombic pyramid-type continuously variable transmission mechanism, selectively controlling engagement of the first clutch, the fifth clutch, the sixth clutch, and the ninth clutch, and selectively controlling engagement of the second clutch and the tenth clutch or engagement of the third clutch and the fourth clutch.

5. The gear-hydraulic-rhombic pyramid integrated multi-mode hybrid transmission device according to claim 3, wherein hydraulic-rhombic pyramid-gear hybrid transmission is provided between the input assembly and the output assembly by adjusting the displacement ratio of the hydraulic transmission mechanism, adjusting the transmission ratio of the rhombic pyramid-type continuously variable transmission mechanism, and selectively controlling engagement of the first clutch, the second clutch, the fourth clutch, the sixth clutch, and the tenth clutch.

6. The gear-hydraulic-rhombic pyramid integrated multi-mode hybrid transmission device according to claim 3, wherein stepless speed regulation of switching between transmission modes "hydraulic transmission→gear transmission→hydraulic-gear hybrid transmission→hydraulic-rhombic pyramid-gear hybrid transmission" is provided by adjusting the displacement ratio of the hydraulic transmission mechanism, adjusting the transmission ratio of the rhombic pyramid-type continuously variable transmission mechanism, and selectively controlling engagement of the clutch assembly and the brake assembly.

7. The gear-hydraulic-rhombic pyramid integrated multi-mode hybrid transmission device according to claim 3, wherein stepless speed regulation of switching between transmission modes "gear-rhombic pyramid hybrid transmission→rhombic pyramid-type continuously variable transmission" is provided by adjusting the transmission ratio of the rhombic pyramid-type continuously variable transmission mechanism and selectively controlling engagement of the clutch assembly and the brake assembly.

8. The gear-hydraulic-rhombic pyramid integrated multi-mode hybrid transmission device according to claim 3, wherein stepless speed regulation of switching between transmission modes "hydraulic transmission→rhombic pyramid-type continuously variable transmission→hydraulic-rhombic pyramid hybrid transmission" is provided by adjusting the displacement ratio of the hydraulic transmission mechanism, adjusting the transmission ratio of the rhombic pyramid-type continuously variable transmission mechanism, and controlling engagement of the clutch assembly.

* * * * *